(12) United States Patent
Hu

(10) Patent No.: US 12,058,723 B2
(45) Date of Patent: Aug. 6, 2024

(54) SYSTEMS AND METHODS FOR PRIORITIZED EDCA CHANNEL ACCESS

(71) Applicant: Meta Platforms Technologies, LLC, Menlo Park, CA (US)

(72) Inventor: Chunyu Hu, Saratoga, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 37 days.

(21) Appl. No.: 17/121,040

(22) Filed: Dec. 14, 2020

(65) Prior Publication Data

US 2021/0289564 A1     Sep. 16, 2021

Related U.S. Application Data

(60) Provisional application No. 62/989,412, filed on Mar. 13, 2020.

(51) Int. Cl.
*H04W 28/02*     (2009.01)
*H04L 47/24*     (2022.01)
(Continued)

(52) U.S. Cl.
CPC ........... *H04W 72/543* (2023.01); *H04L 47/24* (2013.01); *H04W 28/02* (2013.01); *H04W 48/06* (2013.01);
(Continued)

(58) Field of Classification Search
CPC . H04W 72/56; H04W 72/1242; H04W 28/02; H04W 72/082; H04L 47/24;
(Continued)

(56) References Cited

U.S. PATENT DOCUMENTS 10,938,644 B2   3/2021   Xiao et al.
2003/0043773 A1   3/2003   Chang
(Continued)

FOREIGN PATENT DOCUMENTS

CN    103918310 A    7/2014
CN    105453686 A    3/2016
(Continued)

OTHER PUBLICATIONS

English Translation for KR-2204935-B1 (which is cited in the Foreign Patent Documents under the letter N) (Year: 2023).*

(Continued)

*Primary Examiner* — Salvador E Rivas
(74) *Attorney, Agent, or Firm* — Foley & Lardner LLP

(57) ABSTRACT

Disclosed herein includes a system, a method, and a device for providing enhanced distribution channel access (EDCA). A wireless device can receive, from a wireless node, an advertisement message comprising a first plurality of parameters for a plurality of time slots available for prioritized access in a wireless local area network (WLAN) to communicate data. The wireless device can send to the wireless node, a request to assign a first time slot of the plurality of time slots to the wireless device for prioritized access. The wireless device can receive, from the wireless node, a response granting access to a first time slot of the plurality of time slots. The response can indicate one or more parameters of the first plurality of parameters for the first time slot. The wireless device can access the first time slot according to the first plurality of parameters.

20 Claims, 7 Drawing Sheets

(51) Int. Cl.
*H04W 48/06* (2009.01)
*H04W 72/0446* (2023.01)
*H04W 72/51* (2023.01)
*H04W 72/543* (2023.01)
*H04W 72/56* (2023.01)
*H04W 74/08* (2009.01)
*H04L 47/267* (2022.01)
*H04W 84/12* (2009.01)

(52) U.S. Cl.
CPC ....... *H04W 72/0446* (2013.01); *H04W 72/51* (2023.01); *H04W 72/56* (2023.01); *H04W 74/0875* (2013.01); *H04L 47/267* (2022.05); *H04W 84/12* (2013.01)

(58) Field of Classification Search
CPC . H04L 29/06517; H04L 65/60; H04L 47/267; H04L 12/40163; H04M 3/5335; H04M 3/4878; H04N 21/812
See application file for complete search history.

(56) References Cited

U.S. PATENT DOCUMENTS

| | | | | |
|---|---|---|---|---|
| 2004/0106405 A1* | 6/2004 | Gabriel | ................ | H04W 28/02 455/452.2 |
| 2007/0140190 A1* | 6/2007 | Rensburg | .............. | H04L 5/0037 370/252 |
| 2009/0168796 A1* | 7/2009 | Pandey | ................ | H04W 72/02 370/458 |
| 2015/0016253 A1* | 1/2015 | Jaska | ..................... | H04L 47/22 370/230.1 |
| 2015/0078358 A1 | 3/2015 | Park et al. | | |
| 2015/0327131 A1 | 11/2015 | Teyeb et al. | | |
| 2015/0341130 A1* | 11/2015 | Zhou | .................... | H04W 28/26 370/336 |
| 2016/0112921 A1 | 4/2016 | Nagasaka et al. | | |
| 2016/0330757 A1 | 11/2016 | Cherian et al. | | |
| 2017/0026874 A1* | 1/2017 | Hassan | .............. | H04W 72/563 |
| 2017/0041961 A1 | 2/2017 | Zou et al. | | |
| 2017/0188268 A1 | 6/2017 | Montemurro et al. | | |
| 2017/0293945 A1* | 10/2017 | Li | .......................... | H04L 12/46 |
| 2020/0213862 A1* | 7/2020 | Sevindik | ............. | H04W 72/082 |
| 2021/0282186 A1* | 9/2021 | Cherian | ............. | H04W 74/008 |

FOREIGN PATENT DOCUMENTS

| | | |
|---|---|---|
| CN | 106464473 A | 2/2017 |
| CN | 109314997 A | 2/2019 |
| EP | 3 030 034 A1 | 6/2016 |
| KR | 2204935 B1 * | 1/2021 ............ H04W 72/56 |
| WO | WO-2010/099497 A1 | 9/2010 |

OTHER PUBLICATIONS

International Search Report and Written Opinion on non-Foley case related to U.S. Appl. No. 17/121,200 Dtd Jun. 29, 2021.

Invitation to Pay Additional Fees on non-Foley case related to U.S. Appl. No. 17/121,040 Dtd Jun. 21, 2021.

International Search Report and Written Opinion on non-Foley case related to U.S. Appl. No. 17/121,040 Dtd Aug. 11, 2021.

Notice of Allowance on U.S. Appl. No. 17/121,200 Dtd May 4, 2022.

Orange, S4-160992: "On the Support of UE Delay Testing for MTSI-Based Speech Services over Wifi Radio Access," 3GPP, Sep. 5, 2016, 3 pages.

* cited by examiner

SYSTEMS AND METHODS FOR PRIORITIZED EDCA CHANNEL ACCESS

CROSS-REFERENCE TO RELATED APPLICATION

This application claims priority to U.S. Provisional Patent Application No. 62/989,412, filed Mar. 13, 2020, which is incorporated by reference in its entirety for all purposes.

FIELD OF DISCLOSURE

The present disclosure is generally related to communications, including but not limited to providing prioritized channel access by an access point (AP) to one or more station (STA) devices.

BACKGROUND

Artificial reality such as a virtual reality (VR), an augmented reality (AR), or a mixed reality (MR) provides immersive experience to a user. In one example, a user wearing a head wearable display (HWD) can turn the user's head, and an image of a virtual object corresponding to a location of the HWD and a gaze direction of the user can be displayed on the HWD to allow the user to feel as if the user is moving within a space of an artificial reality (e.g., a VR space, an AR space, or a MR space). In one implementation, an image of a virtual object is generated by a console communicatively coupled or tethered to the HWD. In some setups, the console may have access to a wireless network and the HWD accesses the network via the console device.

SUMMARY

Devices, systems and methods for providing enhanced distribution channel access (EDCA), for example, for latency sensitive links or applications are disclosed herein. A wireless node (e.g., access point) can configure a set of links and time slots associated with the links having prioritized parameters to provide predictable and prioritized access to the links and time slots. The time slots can be configured having parameters to support applications or wireless devices (e.g., stations) having latency sensitive traffic, including traffic associated with augmented reality (AR) applications and/or virtual reality (VR) applications. The wireless node can advertise the parameters for the prioritized time slots to one or more wireless devices and the wireless devices can request access to the prioritized time slots responsive to the advertisement. Thus, the wireless node can provide a portion of the time slots as dedicated for prioritized access and the remaining time slots can be maintained for non-prioritized access or regular traffic. In embodiments, the prioritized time slots can be configured having a first set of EDCA parameters and the non-prioritized time slots can be configured having a second set of EDCA parameters that are different from the first set of EDCA parameters.

In at least one aspect, a method is provided. The method can include receiving, by a wireless device from a wireless node, an advertisement message comprising a first plurality of parameters for a plurality of time slots available for prioritized access in a wireless local area network (WLAN) to communicate data. The method can include sending, by the wireless device to the wireless node, a request to assign a first time slot of the plurality of time slots to the wireless device for prioritized access. The method can include receiving, by the wireless device from the wireless node, a response granting access to a first time slot of the plurality of time slots, the response indicating one or more parameters of the first plurality of parameters for the first time slot. The method can include accessing, by the wireless device, the first time slot according to the one or more parameters of the first plurality of parameters indicated in the response.

In embodiments, the method can include receiving, by the wireless device from the wireless node, a message indicating a second plurality of time slots for non-prioritized access to communicate data. The second plurality of time slots can be associated with a second plurality of parameters different from the first plurality of parameters. The first plurality of parameters can include enhanced distribution channel access (EDCA) parameters for prioritized access. The first plurality of parameters can include at least one of: a parameter of a time interval duration that includes one or more of the slots, a parameter for slot duration, a parameter for contention window or a parameter for interframe spacing.

The method can include accessing, by the wireless device for a first type of traffic according to first plurality of parameters, the first time slot according to a contention window and a first timer configured for prioritized access. The method can include accessing, by the wireless device for a second type of traffic, the first time slot according to a second timer for non-prioritized access, the second timer different from the first timer. The method can include accessing, by the wireless device, a second time slot of the plurality of time slots according to a second plurality of parameters different from the first plurality of parameters.

In embodiments, the method can include sending, by the wireless device to the wireless node, the request to assign a first set of time slots of the plurality of time slots to the wireless device for prioritized access. The first set of time slots can include at least one of: a time slot for uplink traffic, a time slot for downlink traffic, a contiguous number of time slots, or a non-contiguous number of time slots. The method can include accessing, by the wireless device, the first set of time slots according to the first plurality of parameters. The method can include accessing, by the wireless device, a first time interval of the first time slot for a first data communication. The method can include accessing, by a second wireless device, a second time interval of the first time slot for a second data communication, the second time interval different from the first time interval. The method can include receiving, by the wireless device from the wireless node responsive to the request, the response assigning the first time slot of the plurality of time slots to the wireless device and the first time slot can be a different time slot from the at least one time slot requested by the wireless device. The advertisement message can include at least one of: a beacon signal, a probe response or an action frame.

In at least one aspect, a wireless device is provided. The wireless device can include one or more processors configured to receive, from a wireless node, an advertisement message comprising a first plurality of parameters for a plurality of time slots available for prioritized access in a wireless local area network (WLAN) to communicate data. The wireless device can include one or more processors configured to send, to the wireless node, a request to assign a first time slot of the plurality of time slots to the wireless device for prioritized access. The wireless device can include one or more processors configured to receive, from the wireless node, a response granting access to a first time slot of the plurality of time slots, the response indicating one or more parameters of the first plurality of parameters for the first time slot. The wireless device can include one or more processors configured to access the first time slot according to the one or more parameters of the first plurality of parameters indicated in the response.

In embodiments, the wireless device can include one or more processors configured to receive, from the wireless node, a message indicating a second plurality of time slots for non-prioritized access to communicate data. The second plurality of time slots can be associated with a second plurality of parameters different from the first plurality of parameters. The first plurality of parameters can include enhanced distribution channel access (EDCA) parameters for prioritized access. The first plurality of parameters can include at least one of: a parameter of a time interval duration that includes one or more of the slots, a parameter for slot duration, a parameter for contention window or a parameter for interframe spacing.

The wireless device can include one or more processors configured to access, for a first type of traffic according to the first plurality of parameters, the first time slot according to a contention window and a first timer configured for prioritized access. The wireless device can include one or more processors configured to access, for a second type of traffic, the first time slot according to a second timer for non-prioritized access, the second timer different from the first timer. The wireless device can include one or more processors configured to access a second time slot of the plurality of time slots according to a second plurality of parameters different from the first plurality of parameters.

The wireless device can include one or more processors configured to send, to the wireless node, the request to assign a first set of time slots of the plurality of time slots to the wireless device for prioritized access. The first set of time slots can include at least one of: a time slot for uplink traffic, a time slot for downlink traffic, a contiguous number of time slots, or a non-contiguous number of time slots. The wireless device can include one or more processors configured to access the first set of time slots according to the first plurality of parameters. The wireless device can include one or more processors configured to receive, from the wireless node responsive to the request, the response assigning the first slot of the plurality of slots to the wireless device and the first time slot can be a different time slot from the at least one time slot requested by the wireless device.

In at least one aspect, a method is provided. The method can include configuring, by a wireless node, a time interval into a plurality of time slots having a first plurality of parameters for prioritized access in a wireless local area network (WLAN) to communicate data. The method can include transmitting, by the wireless node to a plurality of wireless devices, an advertisement message indicating the plurality of time slots available for prioritized access to communicate data. The method can include receiving, by the wireless node from a first wireless device of the plurality of wireless devices, a request to assign a first time slot of the plurality of time slots to the first wireless device for prioritized access. In embodiments, the first wireless device can access the first time slot according to the first plurality of parameters.

In at least one aspect, a wireless node is provided. The wireless node can include one or more processors configured to configure a time interval into a plurality of time slots having a first plurality of parameters for prioritized access in a wireless local area network (WLAN) to communicate data. The wireless node can include one or more processors configured to transmit, to a plurality of wireless devices, an advertisement message indicating the plurality of time slots available for prioritized access to communicate data. The wireless node can include one or more processors configured to receive, from a first wireless device of the plurality of wireless devices, a request to assign a first time slot of the plurality of time slots to the first wireless device for prioritized access. In embodiments, the first wireless device can access the first time slot according to the first plurality of parameters.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Figure 1:
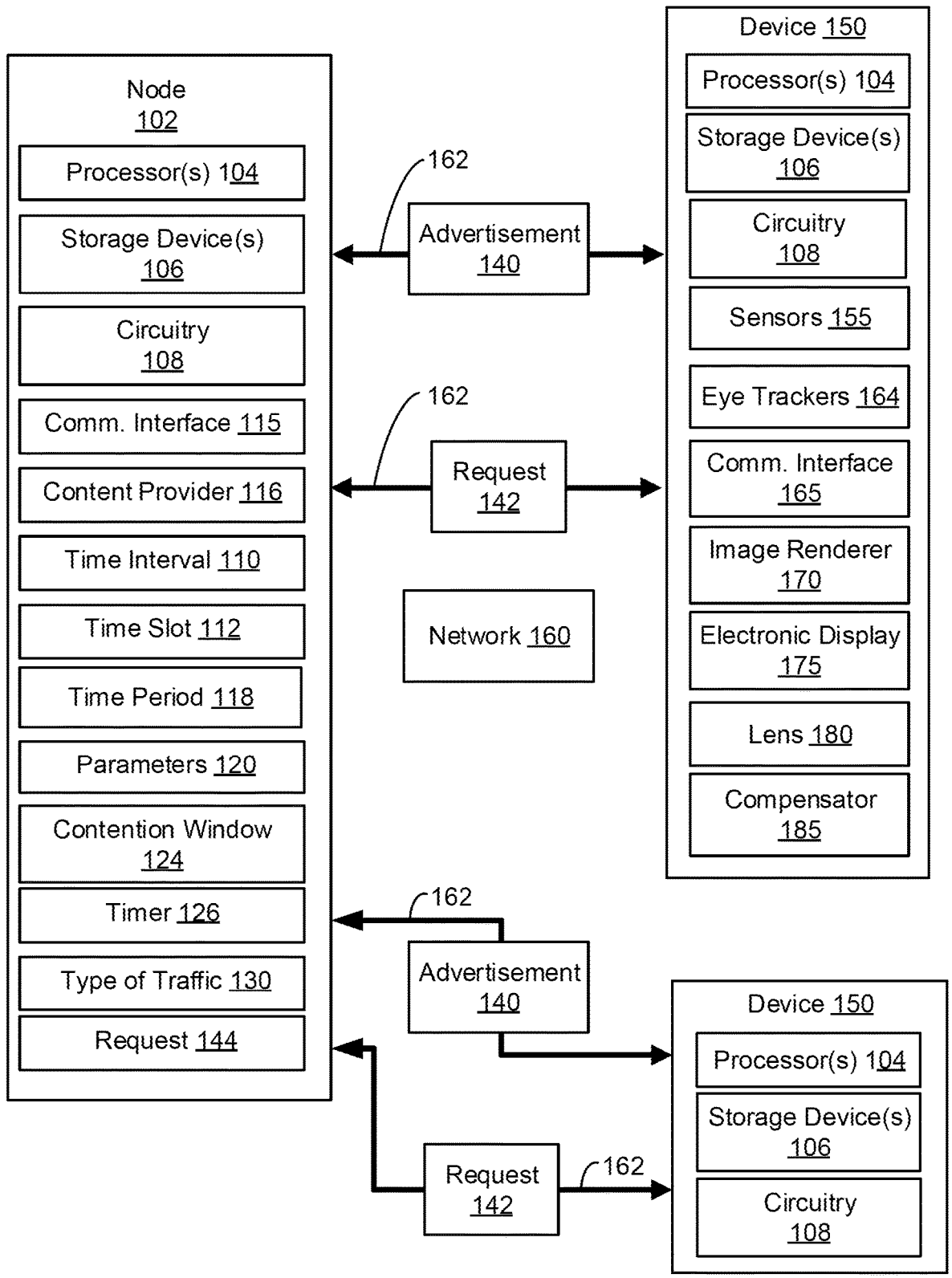
FIG. 1 is a diagram of a system for providing prioritized EDCA channel access, according to an example implementation of the present disclosure.

The subject matter of the present disclosure is directed to techniques for providing prioritized enhanced distribution channel access (EDCA) for latency sensitive links. For multi-link operations, an access point device can dedicate a subset of links for latency sensitive traffic to meet the requests or requirements of applications or station (STA) devices having latency sensitive traffic. The subset of links can be configured having prioritized parameters to provide priority to latency sensitive applications during one or time periods/slots associated with the assigned subset of links.

Some applications (e.g., AR/VR applications) can be more sensitive to latency issues when transmitting and receiving communications or data. The latency sensitive applications can include one or more downlink (DL) and one or more uplink (UL) streams having determined parameters. The amount of traffic for the latency sensitive applications can vary from interval to interval. The streams may include communications that are bursty and periodic. However, present communication protocols (e.g., WLAN protocols) may not support the needs of latency sensitive traffic, for example, resulting in reduced user experience for an end user of the particular application. The systems may not provide predictable channel access resulting increased latency, judder and degraded user experience.

The techniques described herein provide improved predictability and prioritized channel access for latency sensitive applications. Communications between different devices (e.g., access point device, station devices, peer devices) can take place within a duration of periodic intervals, and the intervals can be divided into slots having a determined length (e.g., time period). A subset or portion of the slots are assigned for prioritized access for latency sensitive applications. The remaining slots can be maintained for regular traffic. The channel access for latency sensitive traffic can be assigned a first set of EDCA parameters over the priority slots and the regular slots can be configured having a second set of EDCA parameters that are different from the first set of EDCA parameters.

An access point device can broadcast, advertise or communicate the slots dedicated for prioritized access by one or more station devices, and can indicate the parameters of the priority slots. For example, the access point device can advertise the priority slots in beacons or probe responses to the station devices. One or more station devices can communicate a request for assignment of a priority slot or multiple priority slots. A station device can request multiple priority slots (e.g., a number of contiguous or non-contiguous priority slots) or a single priority slot. The access point can assign the priority slots based in part on the received requests. The priority slots are configured to support multi-link operations and can be assigned to (or shared/accessed by) multiple station devices.

The access point device can configure the priority slots to have a transmission opportunity (TXOP) level of granularity that is long enough, for example, to hold one or more data frame exchanges (e.g., request to send, clear to send, aggregate MAC protocol data unit). The channel access for the latency sensitive traffic during the priority slots can be configured having different parameters or modified parameters (e.g., more aggressive parameters) as compared to the regular slots to provide prioritized access and support latency sensitive applications. The channel access during the regular slots can be assigned default EDCA parameters and can include a first back-off timer that the station devices use to access the channel. The channel access for the latency sensitive traffic during the priority slots can be modified to use new EDCA parameters and can include a second back-off timer that the station devices can use to access the channel during the priority slots. The parameters can include, but are not limited to, a time interval duration, a slot duration, contention window properties, transmit opportunity (e.g., txop) duration and interframe spacing properties.

Latency sensitive traffic can include periodic, bursty traffic, and the amount of traffic in each interval can vary. For example, the traffic may complete prior to the end of a current service period (e.g., group of contiguous slots) or a slot. The access point device can assign and give priority access during priority slots to latency sensitive traffic and if the respective traffic completes prior to the end of a slot, regular traffic can access the remaining portion of the priority slot, e.g., to support multi-link operations and provide flexible scheduling.

The priority slots can be configured to handle a certain range of traffic amount variations of latency sensitive traffic (e.g., priority traffic) in each interval. For example, an initial portion or beginning of a service period (or priority slot) can be protected or configured to tolerate small variations of time packets being ready to transmit (e.g., from Application layer operation/triggering to wake-up time). The service period (or priority slot(s)) can be protected or configured to apply A-AIFS for regular traffic (and maintain default parameters for the regular traffic). The service period (or priority slot(s)) can be released (e.g., automatically) when the priority traffic completes.

An owner (or assigned STA) of the assigned priority slots can access the slots using the prioritized set of EDCA parameters for low latency access. Non-owners (e.g., non-assigned STAs) of the assigned slots may access the slots but with a lower prioritized access, for example, using the default set of EDCA parameters or a third set of EDCA parameters having less priority than the second set of EDCA parameters. This non-exclusive access to the slots can provide advantages as traffic may not be constant and can vary over time for the same traffic stream (e.g., video frame size can vary frame by frame after compression). Unused portions in slots can still be made available to non-owners to access, therefore, not wasting bandwidth. The non-exclusive access to the slots can provide flexibility in scheduling while maintaining support for latency sensitive applications through prioritized channel access.

Referring now to FIG. 1, a system 100 for providing prioritized enhanced distributed channel access (EDCA) is depicted. In brief overview, the system 100 can include a wireless node 102 (e.g., access point) in communication with one or more wireless devices 150 (e.g., stations (STA)) through network 160. The wireless device 150 can contend for or request access to communicate with the wireless node 102 and/or other wireless devices 150 for a variety of different transmissions including, but not limited to, downlink transmissions, uplink transmission and/or peer-to-peer transmissions. The wireless node 102 can provide a predictable and/or more reliable prioritized channel access to the one or more wireless devices 150 for high latency applications, augmented reality (AR) applications and/or virtual reality (VR) applications.

The wireless node 102 can include an access point (e.g., wireless access point) to provide a wireless network 160 or connect one or more wireless devices 150 to a wireless network 160. In embodiments, the wireless node 102 can include a networking hardware device to create a wireless network 160 or provide connections to a wireless network 160. In some embodiments, the wireless node 102 can project a Wi-Fi signal to a designated area to create a wireless network 160 or provide connections to a wireless network 160. The wireless node 102 can connect to a router or be provided as a component of a router for connecting one or more wireless devices 150 to the wireless network 160. The wireless network 160 can include, but is not limited to, a Wireless Local Area Network (WLAN)), a Local Area Network (LAN), a Wide Area Network (WAN), a Personal Area Network (PAN), company Intranet or the Internet through a variety of wireless or cellular connections. The wireless network 160 can include a public network, private network or a combination of a private network and a public network.

The wireless node 102 can include or correspond to a console providing content of artificial reality to one or more wireless devices 150 (e.g., head wearable display (HWD 150)). The wireless node 102 can determine a view within the space of the artificial reality corresponding to the detected location and the gaze direction, and can generate an image depicting the determined view. The wireless node 102 may provide the image to a wireless device 150 (e.g., HWD) for rendering. In some embodiments, the system 100 can include or correspond to an artificial reality system environment that includes more, fewer, or different components than shown in FIG. 1. In some embodiments, functionality of one or more components of the artificial reality system environment 100 can be distributed among the components in a different manner than is described here. For example, some of the functionality of the wireless device 150 (e.g., console) may be performed by one or more wireless devices (e.g., HWDs). For example, some of the functionality of the wireless devices 150 (e.g., HWD) may be performed by the wireless node 102 (e.g., console).

The wireless node 102 can include a processor 104. The processor 104 can include any logic, circuitry and/or processing component (e.g., a microprocessor) for pre-processing input data for the wireless node 102, and/or for post-processing output data for the wireless node 102. The one or more processors 104 can provide logic, circuitry, processing component and/or functionality for configuring, controlling and/or managing one or more operations of the wireless node 102. For instance, a processor 104 may receive data and metrics, including but not limited to, time slots 112 and/or parameters 120. In some embodiments, the processors 104 can include or correspond to a driver or host driver of the wireless node 102 to execute or perform one or more portions of the processes or methods (e.g., method 400) described herein. The processor 104 can be the same as or similar to processing units 516 described above with respect to FIG. 5.

The wireless node 102 can include a storage device 106. The storage device 106 can include a static random access memory (SRAM) or any other types of memory, storage drive or storage register. The storage device 106 can include a static random access memory (SRAM) or internal SRAM, internal to the wireless node 102. In some embodiments, the storage device 106 can be included within an integrated circuit of the wireless node 102. The storage device 106 can include a memory (e.g., memory, memory unit, storage device, etc.). The memory may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an example embodiment, the memory is communicably connected to the processor 104 via a processing circuit and includes computer code for executing (e.g., by the processing circuit and/or the processor) the one or more processes or methods (e.g., method 400) described herein. In some embodiments, the storage device 106 can include, be the same as or substantially similar to storage 518 of FIG. 5. The wireless node 102 can include circuitry 108. The circuitry 108 can be a component of or part of computing system 514 described with respect to FIG. 5. In embodiments, the circuitry 108 can include a processor to perform all of or parts of method 400 described with respect to FIG. 4.

In some embodiments, the wireless node 102 is an electronic component or a combination of an electronic component and a software component that provides content to be rendered to one or more wireless devices 150. In one aspect, the wireless node 102 includes a communication interface 115 and a content provider 116. These components may operate together to determine a view (e.g., a FOV of the user) of the artificial reality corresponding to the location of a wireless device 150 and the gaze direction of the user of the wireless device 150, and can generate an image of the artificial reality corresponding to the determined view. In other embodiments, the wireless node 102 includes more, fewer, or different components than shown in FIG. 1. In some embodiments, the wireless node 102 is integrated as part of the wireless device 150.

In some embodiments, the communication interface 115 is an electronic component or a combination of an electronic component and a software component that communicates with the wireless device 150. The communication interface 115 may be a counterpart component to the communication interface 165 to communicate with a communication interface 115 of the wireless node 102 through a communication link (e.g., USB cable) or communication channel 162. Through the communication channel 162, the communication interface 115 may receive from the wireless device 150 sensor measurements indicating the determined location and orientation of the wireless device 150 and/or the determined gaze direction of the user. Moreover, through the communication channel 162, the communication interface 115 may transmit to the wireless device 150 data describing an image to be rendered.

The content provider 116 is a component that generates content to be rendered according to the location and orientation of the wireless device 150 and/or the gaze direction of the user of the wireless device 150. In one aspect, the content provider 116 determines a view of the artificial reality according to the location and orientation of the wireless device 150 and/or the gaze direction of the user of the wireless device 150. For example, the content provider 116 maps the location of the wireless device 150 in a physical space to a location within an artificial reality space, and determines a view of the artificial reality space along a direction corresponding to an orientation of the wireless device 150 and/or the gaze direction of the user from the mapped location in the artificial reality space. The content provider 116 may generate image data describing an image of the determined view of the artificial reality space, and transmit the image data to the wireless device 150 through the communication interface 115. In some embodiments, the content provider 116 generates metadata including motion vector information, depth information, edge information, object information, etc., associated with the image, and transmits the metadata with the image data to the wireless device 150 through the communication interface 115. The content provider 116 may encode the data describing the image, and can transmit the encoded data to the wireless device 150. In some embodiments, the content provider 116 generates and provides the image to the wireless device 150 periodically (e.g., every one second).

The wireless node 102 can provide access to one or more access communication channels 162 to one or more wireless devices 150 to perform DL transmission, UL transmissions and/or peer-to-peer transmission. The communication can be monitored and managed based in part on a time period 118 that is divided or partition into a plurality of time intervals 110. The time intervals 110 can include fixed intervals or configurable intervals. The time intervals 110 can be periodic intervals having the same duration. In embodiments, the time intervals 110 can be configurable intervals such that a first time interval 110 has a different duration from one or more other time intervals 110.

The duration of the time intervals 110 can be selected based in part on the duration of the total time or time period being divided. For example, the duration of the time intervals 110 can include, but is not limited to, $2^a$ TUs. In embodiments, the duration of the slots 112 can be selected based in part on the duration of the time interval 110. For example, the duration of the slots 112 can include, but is not limited to a 0.5*duration of time interval 110, 2*duration of time interval 110, or 4*duration of time interval 110.

The wireless node 102 can divide or partition the time intervals 110 into a plurality of time slots 112. The time slots 112 can include fixed time slots or configurable time slots, for example, having properties determined based in part on an amount of data to be communicated or transmitted. The time slots 112 can be periodic time slots 112 having the same duration. In some embodiments, the time slots 112 can have different durations such that a first time slot 112 has a different duration from one or more other time slots 112.

The wireless node 102 can configure the time slots 112 having different parameters 120 to provide prioritized access to a portion of the time slots 112 and regular or non-prioritized access to a portion of the time slots 112. For example, the wireless node 102 can configure a portion of the time slots having first parameters to provide prioritized access to the time slots 112 for one or more wireless devices 150 and a portion of the time slots having second parameters 120 (e.g., default parameters) to provide non-prioritized access or regular access to the time slots 112 for one or more wireless devices 150. The first parameters 120 and second parameters 120 can include or correspond to similar or the same parameters but have different values to provide a different level of access or quality of service using the respective channel 162. In embodiments, a first parameter 120 can have a different value (e.g., higher value, lower value) from a second parameter 120. The parameters 120 can include, but are not limited to, enhanced distribution channel access (EDCA) parameters, inter-frame spacing parameters (e.g., arbitrating inter-frame spacing (A-AIFS)), contention window parameters, a parameter for a timer 126 (e.g., back-off timer parameters), and any parameters associated with the network 160 and/or communication channels 162 between the node 102 and one or more devices 150.

The wireless node 102 can configure the time slots 112 having first parameters 120 to generate prioritized time slots 112, for example, for high latency application, AR applications and/or VR applications provided by one or more wireless devices 150. The wireless node 102 can assign or allocate the prioritized time slots 112 to one or more wireless devices 150 based in part on requests 142 received from the wireless devices 150 in response to an advertisement 140 identifying the prioritized time slots 112 to the wireless devices 150.

The wireless node 102 can determine or assign a contention window 124 or contention window properties to a time slot 112 to control or handle collisions or competing attempts to access the time slot 112 by multiple wireless devices 150. In embodiments, the contention window 124 can include a duration or time period that a wireless device 150 waits to begin/attempt transmitting data, e.g., after determining the channel 162 and/or time slot 112 is available or un-occupied. In some embodiments, the contention window 124 duration can change (e.g., increase, double) responsive to each collision experienced by a wireless device 150. In embodiments, the contention window 124 can include a time value, integer or variable number.

The wireless node 102 can determine or assign a timer 126 to a time slot 112 or type of time slot 112. The timer 126 can indicate when a wireless device 150 can access a time slot 112. In embodiments, the timer 126 can include a time boundary/margin indicating a period prior to the start of a time slot 112 that access to the respective time slot 112 is restricted to the one or more wireless devices 150 that are assigned the respective time slot 112 and a period after the start of the time slot 112 that access to the respective time slot 112 is restricted to the one or more wireless devices 150 that are assigned the time slot 112. The timer 126 (e.g., first timer 126) for a prioritized time slot 112 can be different from a timer 126 (e.g., second timer 126) for a non-prioritized time slot 112.

In embodiments, the timer 126 can include a back-off timer or back-off counter. The back-off timer can indicate a time period that a wireless device 150 waits to check, re-check or verify that a channel 162 or time slot 112 is available or unoccupied after a collision in attempting to access the time slot 112. In embodiments, the wireless device 150 can begin or start a countdown back-off time configured to designed to expire after a determined time period based in part on the content window 124 properties. After the back-off timer period ends or reaches zero, the wireless device 150 can check if the time slot 112 is available or un-occupied.

The traffic 130 can include a type of data transmitted between the wireless node 102 and the wireless devices 150. The traffic 130 can include data and information transmitted during DL operations, UL operations and/or peer-to-peer communications. In embodiments, a first type of traffic 130 (e.g., first traffic 130) can include prioritized traffic such as, but not limited to, traffic associated with high latency applications, AR applications and/or VR applications. In embodiments, a second type of traffic 130 (e.g., first traffic 130) can include prioritized traffic such as, but not limited to, traffic associated with high latency applications, AR applications and/or VR applications.

The wireless node 102 can generate an advertisement 140 to advertise or identify the prioritized time slots 112 to one or more wireless devices 150. The advertisement 140 can include a signal, a beacon signal, a probe response or an action frame. The advertisement 140 can include a data packet, command or set of instructions indicating the parameters 120 of one or more time slots 112. For example, in certain embodiments, the wireless node 102 can generate the advertisement 140 that can include the first parameters 120 of the slots 112 indicating prioritized access to the respective slots 112 and/or the advertisement 140 can include second parameters 120 for regular or non-prioritized access to the slots 112.

The wireless device 150 can include a station (STA) device having the capability to use the 802.11 protocols. In embodiments, the wireless device 150 can include a client device, head wearable device (HWD), computing system or WiFi device. In some embodiments, the wireless device 150 can be implemented, for example, as a wearable computing device (e.g., smart watch, smart eyeglasses, head wearable display), smartphone, other mobile phone, device (e.g., consumer device), desktop computer, laptop computer, a virtual reality (VR) puck, a VR personal computer (PC), VR computing device, a head mounted device, or implemented with distributed computing devices. The wireless device 150 can be implemented as, include, or be part of a head mounted display (HMD), head mounted device (HMD), head wearable device (HWD), head worn display (HWD) or head worn device (HWD). The wireless device 150 can be implemented to provide VR, augmented reality (AR), and/or mixed reality (MR) experience to a user (e.g., wearing the display) of the wireless device 150 or connected to the wireless device 150. In some embodiments, the wireless device 150 can include conventional, specialized or custom computer components such as processors 104, a storage device 106, a network interface, a user input device, and/or a user output device. In embodiments, the wireless device 150 may include some elements of the HWD 150 shown in FIG. 2.

In some embodiments, the wireless device 150 (e.g., HWD) is an electronic component that can be worn by a user and can present or provide an artificial reality experience to the user. The wireless device 150 may render one or more images, video, audio, or some combination thereof to provide the artificial reality experience to the user. In some embodiments, audio is presented via an external device (e.g., speakers and/or headphones) that receives audio information from the wireless device 150, the wireless node 102, or both, and presents audio based on the audio information. In some embodiments, the wireless device 150 includes sensors 155, eye trackers 164, a communication interface 165, an image renderer 170, an electronic display 175, a lens 180, and a compensator 185. These components may operate together to detect a location of the wireless device 150 and/or a gaze direction of the user wearing the wireless device 150, and render an image of a view within the artificial reality corresponding to the detected location of the wireless device 150 and/or the gaze direction of the user. In other embodiments, the wireless device 150 includes more, fewer, or different components than shown in FIG. 1.

The wireless device 150 can include one or more processors 104. The one or more processors 104 can include any logic, circuitry and/or processing component (e.g., a microprocessor) for pre-processing input data for transmissions to the wireless node 102 and/or another wireless device 150, and/or for post-processing output data for the wireless node 102 and/or wireless device 150. The one or more processors 104 can provide logic, circuitry, processing component and/or functionality for configuring, controlling and/or managing one or more operations of the wireless device 150. For instance, a processor 104 may receive data and metrics, including but not limited to, advertisements 140, time slots 112, and/or parameters 120. In some embodiments, the processors 104 can include or correspond to a driver or host driver of the wireless device 150 to execute or perform one or more portions of the processes or methods (e.g., method 400) described herein. The processor 104 can be the same as or similar to processing units 516 described above with respect to FIG. 5.

The wireless device 150 can include a storage device 106. The storage device 106 can be designed or implemented to store, hold or maintain any type or form of data associated with the wireless device 150. For example, the wireless device 150 can store data associated with advertisements 140, time slots 112, and/or parameters 120. The storage device 106 can include a static random access memory (SRAM) or internal SRAM, internal to the wireless device 150. In some embodiments, the storage device 106 can be included within an integrated circuit of the wireless device 150. The storage device 106 can include a memory (e.g., memory, memory unit, storage device, etc.). The memory may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an example embodiment, the memory is communicably connected to the processor 104 via a processing circuit and includes computer code for executing (e.g., by the processing circuit and/or the processor) the one or more processes or methods (e.g., method 400) described herein. In some embodiments, the storage device 106 can include, be the same as or substantially similar to storage 518 of FIG. 5. The wireless device 150 can include circuitry 108. The circuitry 108 can be a component of or part of computing system 514 described with respect to FIG. 5. In embodiments, the circuitry 108 can include a processor to perform all of or parts of method 400 described with respect to FIG. 4.

The wireless device 150 can generate a request 142, for example, in response to an application request and/or identifying the parameters 120 for the time slots 112 identified in an advertisement 140. The request 142 can include a data packet, command, or set of instructions requesting access to one or more time slots 112, including prioritized time slots 112. The request 142 can include the time slot 112, multiple time slots 112 (e.g., contiguous time slots), a type of traffic 130 (e.g., downlink (DL) traffic, uplink (UL) traffic, peer-to-peer traffic), types of applications (e.g., latency sensitive applications, AR/VR applications) associated with the wireless device 150 and/or an predicted amount or level of traffic associated with the applications supported by the wireless device 150.

The wireless node 102 can generate a response 144, for example, in a received request 142 requesting access to at least one time slot 112. The response 144 can indicate the time slot 112 assigned to the wireless device 150 and one or more parameters 120 for the wireless device 150 to access the time slot 112. The response 144 can include a data packet, command, or set of instructions indicating an assigned or selected time slot 112 or multiple time slots 112, including prioritized time slots 112. The response 144 can identify the time slot 112, multiple time slots 112 (e.g., contiguous time slots), and/or a type of traffic 130 (e.g., downlink (DL) traffic, uplink (UL) traffic, peer-to-peer traffic).

In some embodiments, the sensors 155 include electronic components or a combination of electronic components and software components that detect a location and an orientation of the wireless device 150. Examples of sensors 155 can include: one or more imaging sensors, one or more accelerometers, one or more gyroscopes, one or more magnetometers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 155 detect the translational movement and the rotational movement, and determine an orientation and location of the wireless device 150. In one aspect, the sensors 155 can detect the translational movement and the rotational movement with respect to a previous orientation and location of the wireless device 150, and determine a new orientation and/or location of the wireless device 150 by accumulating or integrating the detected translational movement and/or the rotational movement. Assuming for an example that the wireless device 150 is oriented in a direction 25 degrees from a reference direction, in response to detecting that the wireless device 150 has rotated 20 degrees, the sensors 155 may determine that the wireless device 150 now faces or is oriented in a direction 45 degrees from the reference direction. Assuming for another example that the wireless device 150 was located two feet away from a reference point in a first direction, in response to detecting that the wireless device 150 has moved three feet in a second direction, the sensors 155 may determine that the wireless device 150 is now located at a vector multiplication of the two feet in the first direction and the three feet in the second direction.

In some embodiments, the eye trackers 164 include electronic components or a combination of electronic components and software components that determine a gaze direction of the user of the wireless device 150. In some embodiments, the eye trackers 164 include two eye trackers, where each eye tracker 164 captures an image of a corresponding eye and determines a gaze direction of the eye. In one example, the eye tracker 164 determines an angular rotation of the eye, a translation of the eye, a change in the torsion of the eye, and/or a change in shape of the eye, according to the captured image of the eye, and determines the relative gaze direction with respect to the wireless device 150, according to the determined angular rotation, translation and the change in the torsion of the eye. In one approach, the eye tracker 164 may shine or project a predetermined reference or structured pattern on a portion of the eye, and capture an image of the eye to analyze the pattern projected on the portion of the eye to determine a relative gaze direction of the eye with respect to the wireless device 150. In some embodiments, the eye trackers 164 incorporate the orientation of the wireless device 150 and the relative gaze direction with respect to the wireless device 150 to determine a gate direction of the user. Assuming for an example that the wireless device 150 is oriented at a direction 30 degrees from a reference direction, and the relative gaze direction of the wireless device 150 is −10 degrees (or 350 degrees) with respect to the wireless device 150, the eye trackers 164 may determine that the gaze direction of the user is 20 degrees from the reference direction. In some embodiments, a user of the wireless device 150 can configure the wireless device 150 (e.g., via user settings) to enable or disable the eye trackers 164. In some embodiments, a user of the wireless device 150 is prompted to enable or disable the eye trackers 164.

In some embodiments, the communication interface 165 includes an electronic component or a combination of an electronic component and a software component that communicates with the wireless node 102. The communication interface 165 may communicate with a communication interface 115 of the wireless node 102 through a communication link or communication channel 162. The communication channel 162 may be a wireless link, a wired link, or both. Examples of the wireless link can include a cellular communication link, a near field communication link, Wi-Fi, Bluetooth, or any communication wireless communication link. Examples of the wired link can include a USB, Ethernet, Firewire, HDMI, or any wired communication link. In the embodiments, in which the wireless node 102 and the wireless device 150 are implemented on a single system, the communication interface 165 may communicate with the wireless node 102 through a bus connection or a conductive trace. Through the communication channel 162, the communication interface 165 may transmit to the wireless node 102 sensor measurements indicating the determined location of the wireless device 150 and the determined gaze direction of the user. Moreover, through the communication channel 162, the communication interface 165 may receive from the wireless node 102 sensor measurements indicating or corresponding to an image to be rendered.

In some embodiments, the image renderer 170 includes an electronic component or a combination of an electronic component and a software component that generates one or more images for display, for example, according to a change in view of the space of the artificial reality. In some embodiments, the image renderer 170 is implemented as a processor (or a graphical processing unit (GPU)) that executes instructions to perform various functions described herein. The image renderer 170 may receive, through the communication interface 165, data describing an image to be rendered, and render the image through the electronic display 175. In some embodiments, the data from the wireless node 102 may be encoded, and the image renderer 170 may decode the data to generate and render the image. In one aspect, the image renderer 170 receives the encoded image from the wireless node 102, and decodes the encoded image, such that a communication bandwidth between the wireless node 102 and the wireless device 150 can be reduced. In one aspect, the process of detecting, by the wireless device 150, the location and the orientation of the wireless device 150 and/or the gaze direction of the user wearing the wireless device 150, and generating and transmitting, by the wireless node 102, a high resolution image (e.g., 1920 by 1080 pixels, or 2048 by 1152 pixels) corresponding to the detected location and the gaze direction to the wireless device 150 may be computationally exhaustive and may not be performed within a frame time (e.g., less than 11 ms or 8 ms). In one aspect, the image renderer 170 generates one or more images through a shading process and a reprojection process when an image from the wireless device 150 is not received within the frame time. For example, the shading process and the reprojection process may be performed adaptively, according to a change in view of the space of the artificial reality.

In some embodiments, the electronic display 175 is an electronic component that displays an image. The electronic display 175 may, for example, be a liquid crystal display or an organic light emitting diode display. The electronic display 175 may be a transparent display that allows the user to see through. In some embodiments, when the wireless device 150 is worn by a user, the electronic display 175 is located proximate (e.g., less than 3 inches) to the user's eyes. In one aspect, the electronic display 175 emits or projects light towards the user's eyes according to image generated by the image renderer 170.

In some embodiments, the lens 180 is a mechanical component that alters received light from the electronic display 175. The lens 180 may magnify the light from the electronic display 175, and correct for optical error associated with the light. The lens 180 may be a Fresnel lens, a convex lens, a concave lens, a filter, or any suitable optical component that alters the light from the electronic display 175. Through the lens 180, light from the electronic display 175 can reach the pupils, such that the user can see the image displayed by the electronic display 175, despite the close proximity of the electronic display 175 to the eyes.

In some embodiments, the compensator 185 includes an electronic component or a combination of an electronic component and a software component that performs compensation to compensate for any distortions or aberrations. In one aspect, the lens 180 introduces optical aberrations such as a chromatic aberration, a pin-cushion distortion, barrel distortion, etc. The compensator 185 may determine a compensation (e.g., predistortion) to apply to the image to be rendered from the image renderer 170 to compensate for the distortions caused by the lens 180, and apply the determined compensation to the image from the image renderer 170. The compensator 185 may provide the predistorted image to the electronic display 175.

The wireless node 102 can provide or establish one or more communication channels 162 through the network 160 to one or more wireless devices 150. In some embodiments, the wireless device 150 can establish one or more communication channels 162 through the network 160 to the wireless node 102 and/or one or more other wireless devices 150 (e.g., peer-to-peer transmissions). The communication channels 162 can include, but are not limited to, a primary link, connection (e.g., wireless connection), session (e.g., user and/or application session) and/or link established between the wireless node 102 and one or more wireless devices 150. The communication channels 162 can be established using a communication protocol, including but not limited to, IEEE 802.11 based protocol, Bluetooth based protocol, WiFi based protocol or cellular based protocol. In one embodiment, the communication channels 162 includes IEEE 802.11ay protocol or 802.11ax protocol. The wireless node 102 and wireless devices 150 can use the communication channels 162 to perform a data transfer for downlink operations, uplink operations and/or peer-to-peer transmissions between two or more wireless devices 150. The wireless node 102 and wireless devices 150 can use the communication channels 162 to provide or support a full VR experience, AR experience or MR experience for a user of a wireless device 150 or a device (e.g., head wearable display) connected to a wireless device 150.

Figure 2:
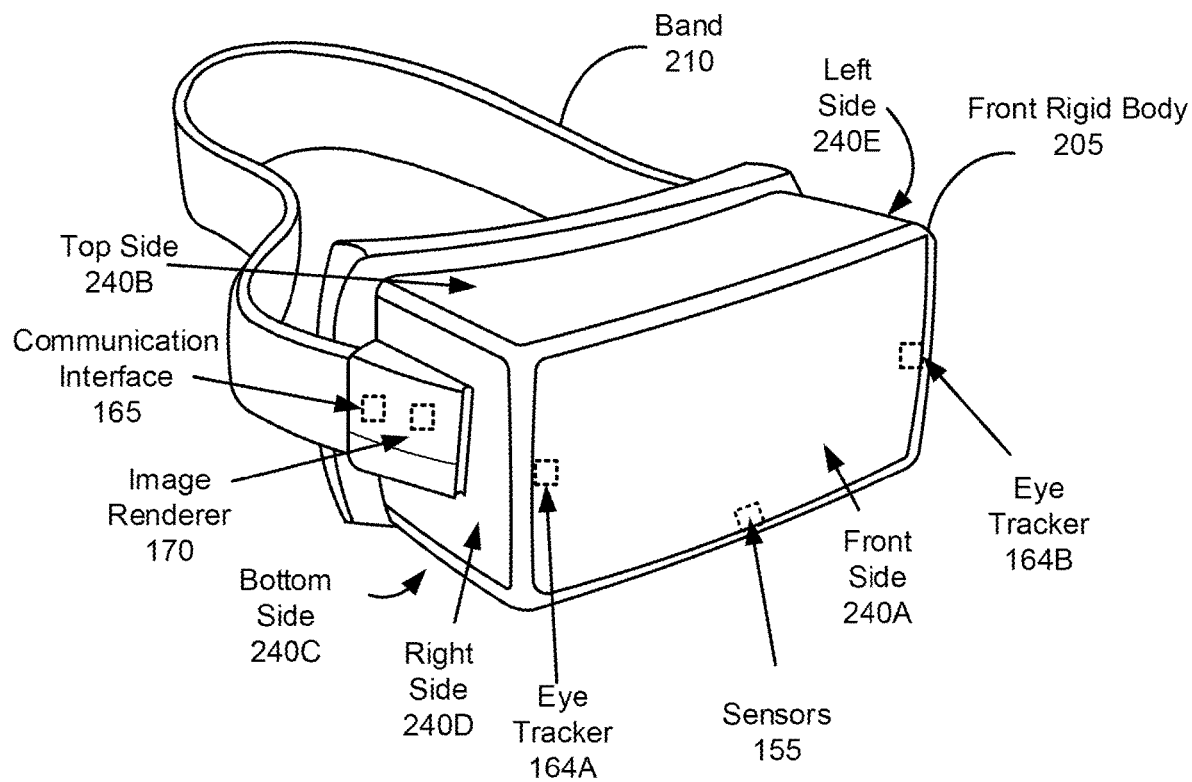
FIG. 2 is a diagram of a head wearable display, according to an example implementation of the present disclosure.

FIG. 2 is a diagram of a HWD wireless device 150, in accordance with an example embodiment. In some embodiments, the HWD wireless device 150 includes a front rigid body 205 and a band 210. The front rigid body 205 includes the electronic display 175 (not shown in FIG. 2), the lens 180 (not shown in FIG. 2), the sensors 155, the eye trackers 164A, 164B, the communication interface 165, and the image renderer 170. In the embodiment shown by FIG. 2, the sensors 155 are located within the front rigid body 205, and may not visible to the user. In other embodiments, the HWD wireless device 150 has a different configuration than shown in FIG. 2. For example, the image renderer 170, the eye trackers 164A, 164B, and/or the sensors 155 may be in different locations than shown in FIG. 2.

Figure 3A:
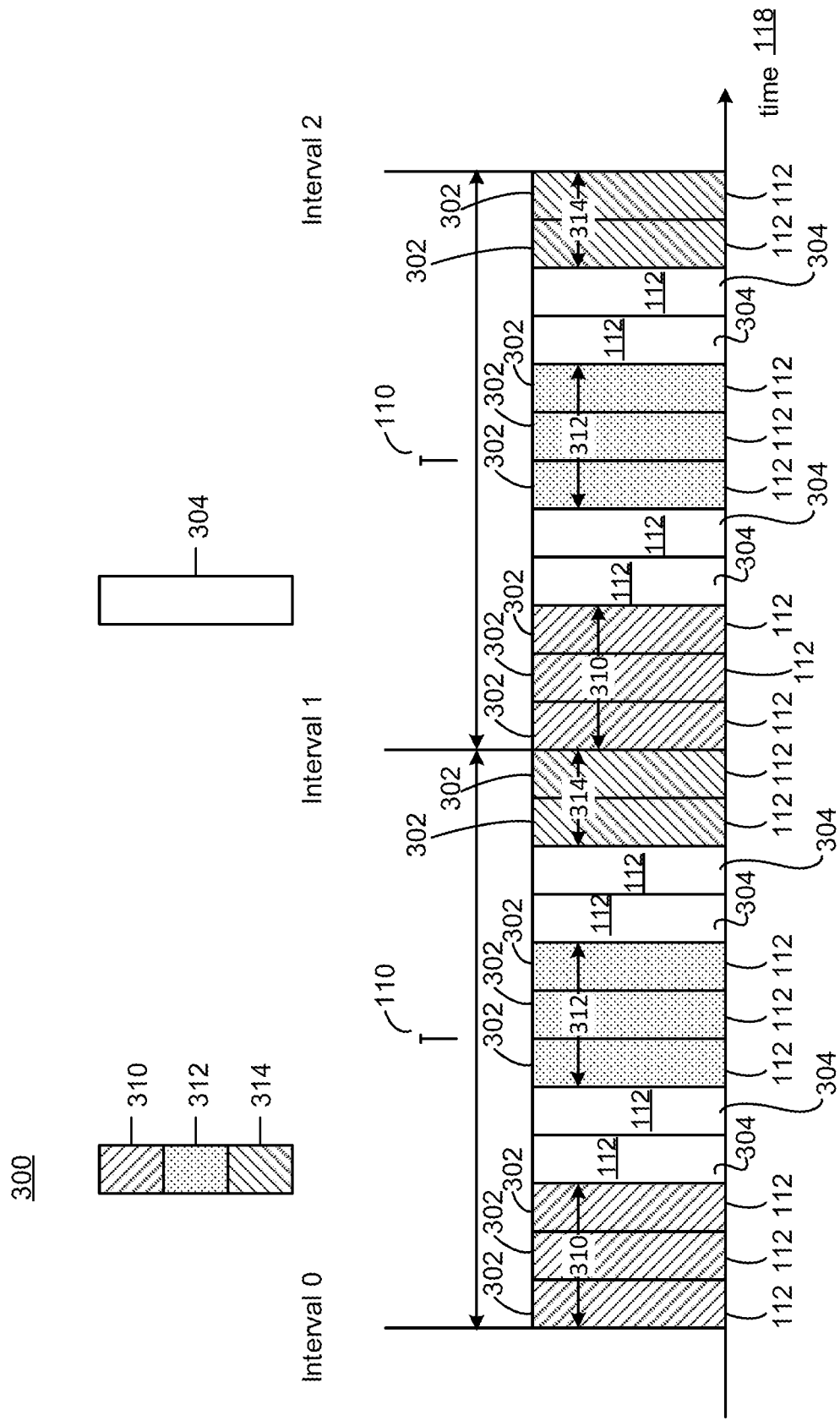
FIG. 3A is an example time period divided into a plurality of time intervals and a plurality of time slots, according to an example implementation of the present disclosure.

Referring now to FIG. 3, depicted is a diagram 300 of a time period 118 having multiple time intervals 110 divided into a plurality of time slots 112. The wireless node 102 can divide or partition the time period 118 into periodic time intervals 110 of a determined duration (e.g., 1024 μsec). The duration of the time intervals 110 can vary based at least in part on the duration of the time period 118, properties of the network 160 and/or one or more channels 162 (e.g., bandwidth, exchange rates) between the wireless node 102 and one or more wireless devices 150.

The wireless node 102 can divide or partition the time intervals 110 into a plurality of time slots 112 based in part on the duration of the time interval 110, a desired transmit opportunity length, and/or a duration of a data frame exchange. In some embodiments, the time slots 112 can be generated or divided having fixed durations or configurable durations. The duration of a time slot 112 can be selected for a transmit opportunity (txop) level of granularity and/or long enough to support or hold one more data frame exchanges. For example, the duration of a time slot 112 can be selected to support or hold one more request to send (rts) exchange, clear to send (cts) exchange, aggregate MAC protocol data unit (a-mpdu) exchange, acknowledgment (ack) exchange, and/or block acknowledgement exchange.

The time slots 112 can be configured having different parameters 120, for example, to provide or afford prioritized access to one or more of the time slots 112 for high latency applications or prioritized traffic. In embodiments, the prioritized traffic 130 can include, but is not limited to, augmented reality (AR) traffic and virtual reality (VR) traffic for AR/VR type applications or devices. The number of time slots 112 reserved or configured for prioritized access can vary and be selected based at last in part on the number of time slots 112 available, an amount of traffic communicated between the wireless node 102 and one or more devices 150 and/or a predicted amount of prioritized traffic 130 (e.g., first type of traffic). For example, and as illustrated in FIG. 3, a portion of the time slots 112 can be configured as prioritized time slots 302 configured having first parameters 120 and a portion of the time slots 112 can be configured as non-prioritized time slots 304 configured having second parameters 120. The ratio or difference between the number of prioritized time slots 302 and non-prioritized time slots 304 can vary and be selected based at last in part on the number of time slots 112 available, an amount of traffic communicated between the wireless node 102 and one or more devices 150 and/or a predicted amount of prioritized traffic 130 (e.g., first type of traffic).

The wireless node 102 can configure the prioritized time slots 302 having a first set of parameters 120 or first parameters 120. The first parameters 120 can include, but are not limited to, enhanced distribution channel access (EDCA) parameters, inter-frame spacing parameters (e.g., arbitrating inter-frame spacing (A-AIFS)), contention window parameters, a parameter for a first timer 126 (e.g., first back-off timer parameters), and any parameters associated with the network 160 and/or channels 162 between the node 102 and one or more devices 150. The wireless node 102 can assign or allocate the prioritized time slots 112 to one or more wireless devices 150 based in part on requests 142 received from the wireless devices 150 in response to an advertisement 140 identifying the prioritized time slots 112 to the wireless devices 150. The wireless node 102 can monitor and control access and transmissions (e.g., downlink transmissions, uplink transmissions, peer-to-peer transmission) and operations performed during the prioritized time slots 302 using the first parameters 120 and the first timer 126.

In embodiments, the remaining time slots 112 or time slots 112 not configured for prioritized access can include or correspond to non-prioritized time slots 304 configured having regular or default parameters 120. The wireless node 102 can configure the non-prioritized time slots 304 having a second set of parameters 120 or second parameters 120. The second parameters 120 can correspond to default parameters and are different from the first parameters 120 in terms of value. For example, the second parameters 120 can include, but are not limited to, enhanced distribution channel access (EDCA) parameters, inter-frame spacing parameters (e.g., arbitrating inter-frame spacing (A-AIFS)), contention window parameters, a parameter for a second timer 126 (e.g., second back-off timer parameters), and any parameters associated with the network 160 and/or channels 162 between the node 102 and one or more devices 150. In embodiments, the EDCA second parameters 120 can be different form the EDCA first parameters 120, inter-frame spacing second parameters 120 can be different from the inter-frame spacing first parameters 120, the contention window second parameters can be different from the contention window first parameters, and the second timer 126 can be different from the first timer 126. In some embodiments, the remaining time slots 112 not assigned to a specific wireless device 150 or not requested by a specific wireless device 150 for prioritized access can be configured or labeled as a non-prioritized time slot 304. The wireless node 102 can monitor and control access and transmissions (e.g., downlink transmissions, uplink transmissions, peer-to-peer transmission) and operations performed during the non-prioritized time slots 112 using the second parameters and the second timer 126.

The prioritized time slots 302 can be assigned to different wireless devices 150 in response to requests 142 received from the wireless devices 150. For example, a first subset 310 of the prioritized time slots 302 in the first and second time intervals 110 can be assigned to a first wireless device 150 responsive to the first wireless device 150 transmitting a request 142 to assign the respective prioritized time slots 302 of the plurality of time slots 112 to the first wireless device 150 for prioritized access. In embodiments, a second subset 312 of the prioritized time slots 302 in the first and second time intervals 110 can be assigned to a second wireless device 150 responsive to the second wireless device 150 transmitting a request 142 to assign the respective prioritized time slots 302 of the plurality of time slots 112 to the second wireless device 150 for prioritized access. In embodiments, a third subset 314 of the prioritized time slots 302 in the first and second time intervals 110 can be assigned to a third wireless device 150 responsive to the third wireless device 150 transmitting a request 142 to assign the respective prioritized time slots 302 of the plurality of time slots 112 to the third wireless device 150 for prioritized access. The non-prioritized time slots 304 corresponding to the unassigned time slots 112 can be available for non-prioritized access, for example, according to the second parameters 120.

Figure 3B:
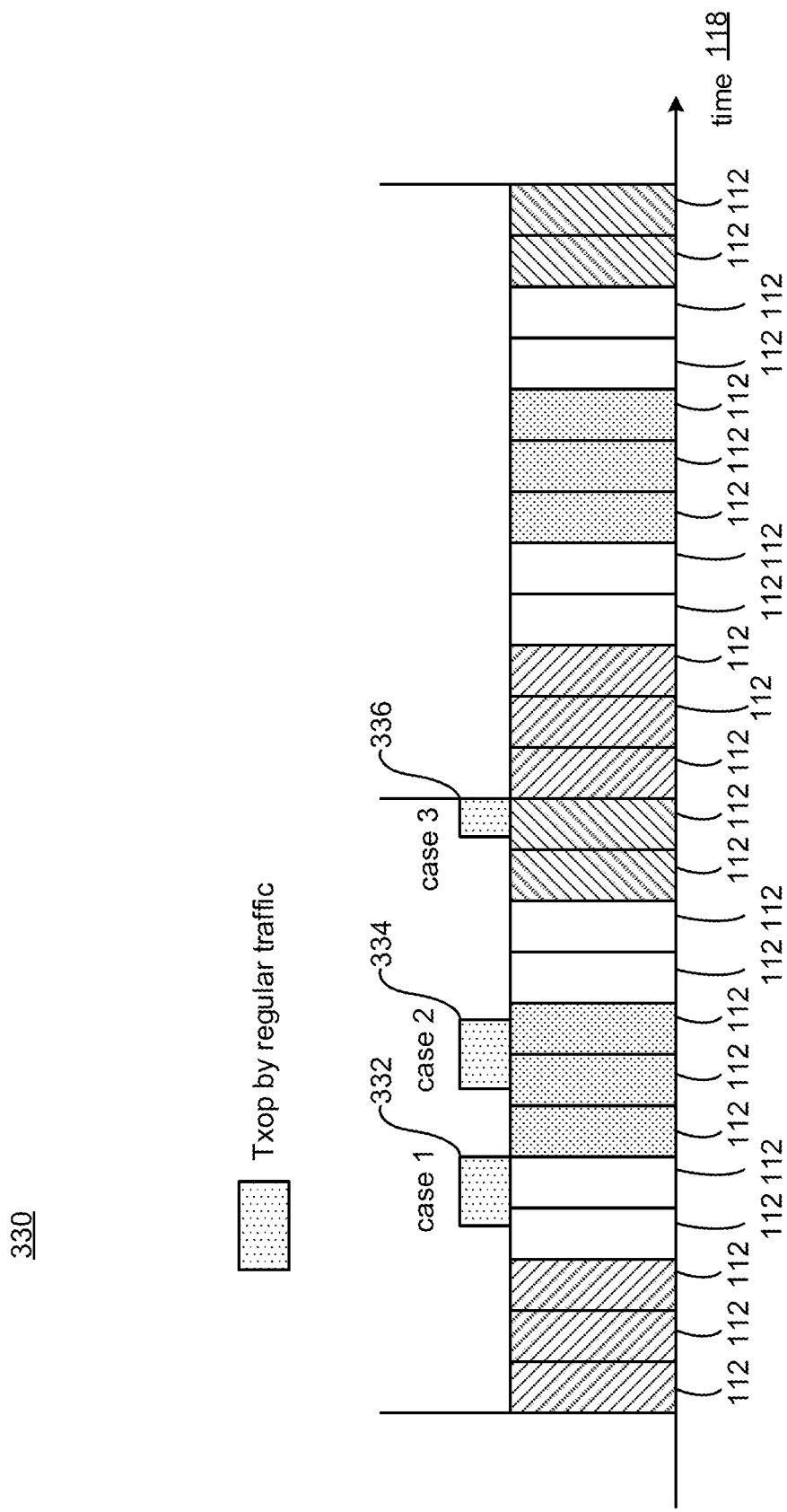
FIG. 3B is a diagram 330 showing time slot boundaries for non-prioritized access, according to an example implementation of the present disclosure.

Now referring to FIG. 3B, a diagram 330 showing time slot boundaries and how wireless devices 150 can contend for access at the time slot boundaries for non-prioritized access is provided. The prioritized time slots 112 and the non-prioritized time slots 112 can have boundaries (e.g., hard boundaries) or borders based in part on the durations of the respective time slots 112. The boundaries of the time slots 112 can control when and what type of traffic 130 is transmitted during the time interval 110. For example, in a first case 332, non-prioritized traffic 130 can stop or be prevented from being transmitted at a slot boundary between a prioritized time slot 112 and a non-prioritized time slot 112. If a wireless device 150 is performing downlink or uplink transmissions using the second type of traffic (e.g., non-prioritized traffic), the transmission can be ended or stopped when the prioritized time slot 112 begins or a determined time period prior to the prioritized time slot 112 as indicated by the first timer 126.

In some embodiments, for example in a second case 334, if the wireless device 150 has been assigned the next or subsequent time slot 112 (e.g., prioritized time slot 112), the wireless node 102 can extend the transmit opportunity or provide additional time into the next or subsequent time slot 112 as the next or subsequent time slot 112 has previously been assigned to the same wireless device 150. In certain embodiments, in a third case 336, if a wireless device 150 gains or wins access to the medium during a prioritized time slot 112 for non-prioritized access to transmit non-prioritized traffic 130, the transmit opportunity (e.g., txop) awarded to the respective wireless device 150 ends at the slot boundary of the respective prioritized time slot 112 and/or boundary of the time interval 110. For example, the wireless device 150 can perform downlink and/or uplink transmission using the second type of traffic (e.g., non-prioritized traffic during the prioritized time slot 112 for the duration of the prioritized time slot 112 or the slot boundary of the prioritized time slot 112. At the slot boundary or when the respective prioritized time slot 112 transitions to a different prioritized time slot 112 or time interval 110, the transmit opportunity for the wireless device 150 can be ended or stopped.

Figure 3C:
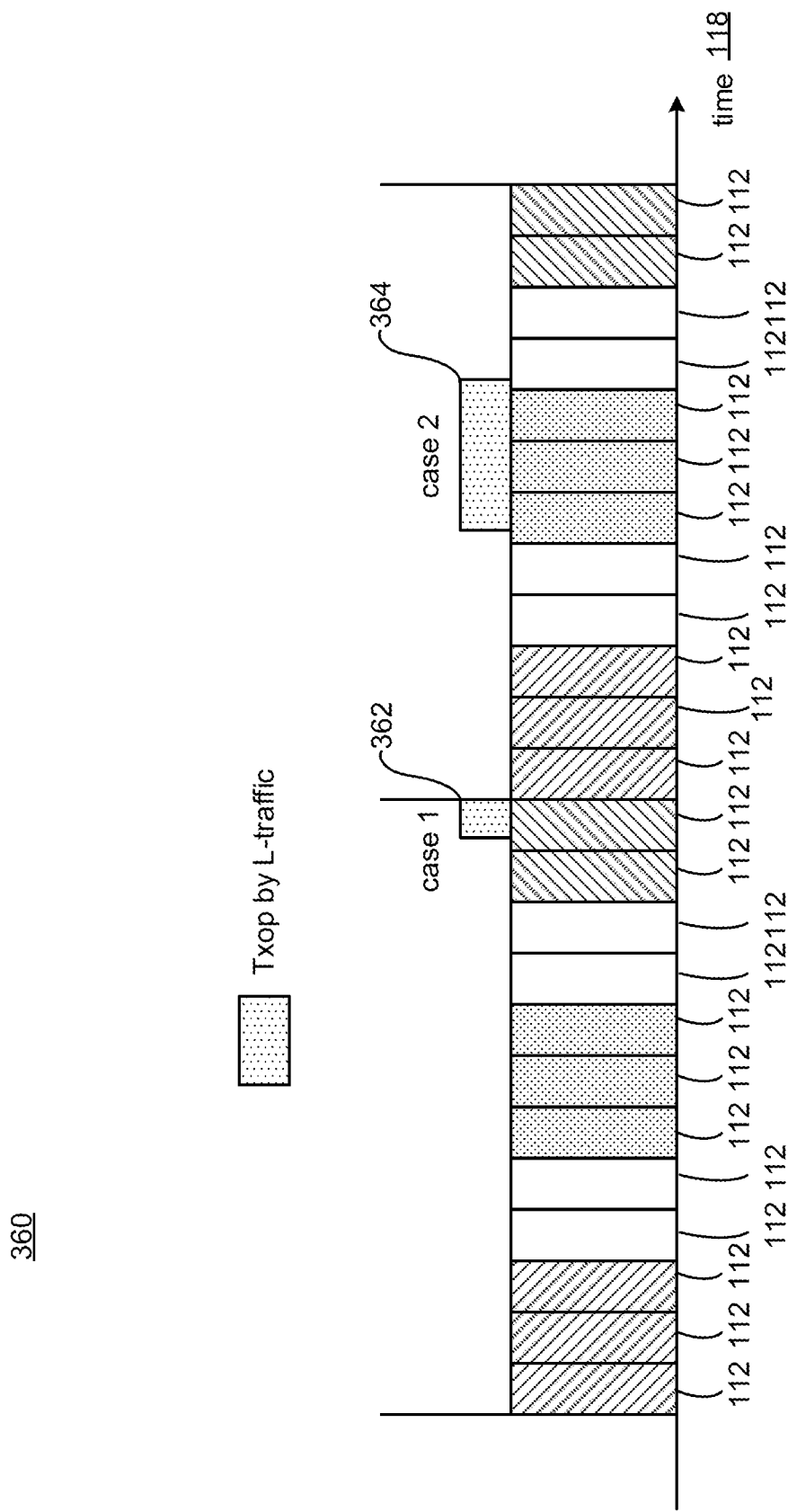
FIG. 3C is a diagram showing time slot boundaries for prioritized access, according to an example implementation of the present disclosure.

Now referring to FIG. 3C, a diagram 360 showing time slot boundaries and how wireless devices 150 contend for access at the time slot boundaries for prioritized access is provided. In embodiments in a first case 362, prioritized traffic 130 can stop or be prevented from being transmitted at/across a slot boundary between a first prioritized time slot 112 and a second, different prioritized time slot 112. For prioritized traffic 130 or the first type of traffic 130, the transmit opportunity can end at the boundary between the prioritized time slot 112 assigned to the respective wireless device 150 and the next prioritized time slot 112 assigned to a different wireless device 150. If a wireless device 150 is performing downlink or uplink transmissions using the first second type of traffic 130 (e.g., prioritized traffic), the transmission can be ended or stopped when a next prioritized time slot 112 begins that is assigned to a different wireless device 150 and is not assigned to the respective wireless device 150.

In some embodiments in a second case 364, prioritized traffic 130 can stop or be prevented from being transmitted at a slot boundary between a prioritized time slot 112 and non-prioritized time slot 112 but the transmit opportunity can be extended for example, if the non-prioritized time slot 112 is available or un-occupied and using the second parameters 120. For example, the wireless device 150 can perform downlink and/or uplink transmission using the first type of traffic during a prioritized time slot 112 for the duration of the prioritized time slot 112 and at the boundary between the prioritized time slot 112 and next time slot 112 that is a non-prioritized time slot 112, the transmit opportunity can be ended or stopped for the wireless device 150. In some embodiments, the transmit opportunity can be extended into the non-prioritized time slot 112 if the wireless node 102 determines that the non-prioritized time slot 112 is available or un-occupied. The wireless device 150 can continue to perform downlink and/or uplink transmission during the non-prioritized time slot 112 but using the second parameters for regular traffic or non-prioritized access.

Figure 4:
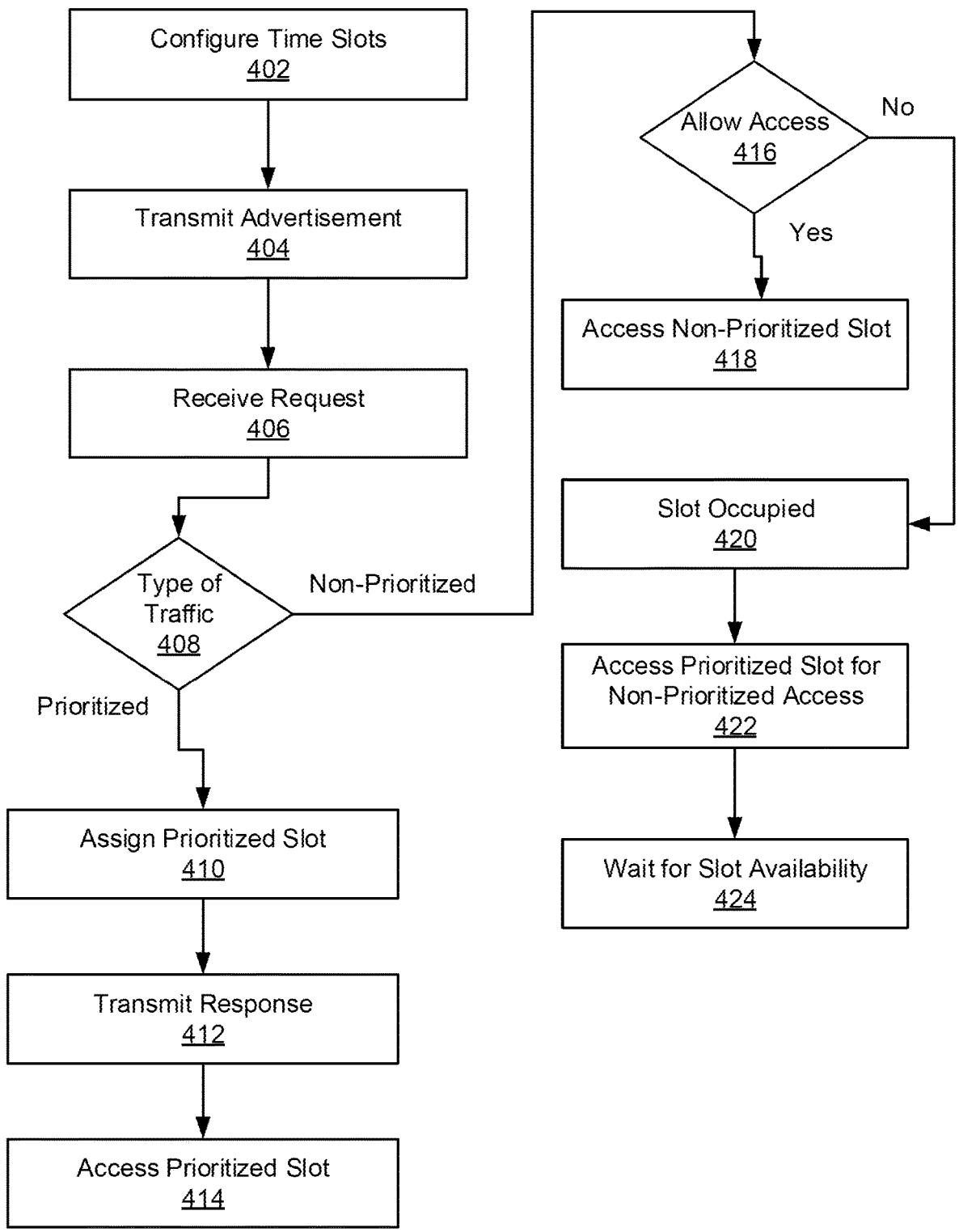
FIG. 4 is a flow chart illustrating a process or method for providing prioritized EDCA channel access, according to an example implementation of the present disclosure.

Now referring to FIG. 4, a method 400 for providing enhanced distribution channel access (EDCA), for example, for latency sensitive links or applications is provided. In brief overview, the method 400 can include configuring time slots (402), transmitting an advertisement (404), receiving a request (406), determining a type of traffic (408), assigning a time slot (410), transmitting a response (412), access a prioritized time slot (414), determining to allow access to a time slot (416), accessing a non-prioritized time slot (418), determining if a time slot is occupied (420), accessing a prioritized time slot for non-prioritized access (422), and waiting for a time slot to become available (424). One or more of these operations may be performed by at least one processor and/or circuitry (e.g., processor 104, circuitry 108).

At operation 402, and in some embodiments, time slots 112 can be configured. A wireless node 102 can divide or partition a time period 118 into a plurality of time intervals 110 having a determined duration. The time intervals 110 can be of equal duration or length. In some embodiments, one or more of the time intervals 110 can be a different duration from one or more other time intervals 110. The wireless node 102 can configure, divide or partition the time intervals 110 into a plurality of slots 112 (e.g., time slots 112). The time slots 112 can have a (pre)determined duration or length. The duration of the time slots 112 can be determined based in part on types of data transmission and communications between the wireless node 102 and one or more wireless devices 150 and/or one or more other wireless nodes 102, including but not limited to, transmit opportunity properties and data frame exchange properties. In some embodiments, the wireless node 102 can select the duration of the time slots 112 to correspond to, align with or match a transmit opportunity (txop) level of granularity, for example, to be long enough to hold or contain one or more data frame exchanges. The wireless node 102 can determine a duration of the time slots 112 to support downlink transmissions, uplink transmissions and/or peer-to-peer transmissions between one or more wireless devices 150. In embodiments, the time slots 112 for a common or same time interval 110 and/or time period 118 can be of equal duration or length. In some embodiments, one or more of the time slots 112 for a common or same time interval 110 and/or time period 118 can be a different duration from one or more other time intervals 110.

The wireless node 102 can configure the time slots 112 having different parameters 120. The wireless node 102 can configure one or more of the time slots 112 having a first plurality of parameters 120 (e.g., first parameters 120) and one or more time slots 112 having a second plurality of parameters 120 (e.g., second parameters 120). The first parameters 120 can include or correspond to prioritized parameters for prioritized access to a respective slot 112. The wireless node 102 can configure a portion of the time slots 112 having first parameters 120 to provide more predictable or reliable access to the respective time slots 112 for high latency applications, AR applications and/or VR applications. The second parameters 120 can include or correspond to regular or default parameters for regular access to a respective slot 112.

The first parameters 120 can include enhanced distribution channel access (EDCA) parameters for prioritized access to a respective slot. In embodiments, the first parameters 120 and second parameters 120 can include a parameter of a time interval duration that includes one or more of the time slots 112, a parameter for slot duration, a parameter for contention window 124, a parameter for a back-off timer 126 or a parameter for interframe spacing. In some embodiments, the first parameters 120 can be a different value from the second parameters 120.

The wireless node 102 (e.g., a soft or regular access point) can configure a portion of the time slots 112 having first parameters 120 to support latency sensitive traffic, for example, associated with AR applications and/or VR applications. The latency sensitive traffic can include or correspond to periodic and/or bursty traffic, and the amount of traffic can vary, for example, during downlink transmissions or uplink transmission, or peer-to-peer transmissions. In embodiments, the traffic may complete (e.g., complete DL, complete UL) transmission prior to the end of a current service period (e.g., group of contiguous time slots 112) or a single time slot 112. The wireless node 102 can assign and give priority access during prioritized time slots 112 to latency sensitive traffic based in part on requests 142 received from wireless devices and if the respective traffic completes prior to the end of a time slot 112, non-prioritized or regular traffic can access the remaining portion of the priority slot, e.g., to support multi-link operations and provide flexible scheduling.

The wireless node 102 can configure the prioritized time slots 112 to support or handle a certain range of traffic amount variations of latency sensitive traffic (e.g., priority traffic) in each time interval 110. For example, an initial portion or beginning of a service period (or prioritized time slot 112) can be protected or configured to tolerate small variations of time packets being ready to transmit (e.g., from Application layer to wake-up time). The service period (or priority slot) can be protected or configured to apply second parameters 120 (e.g., A-AIFS) for non-prioritized or regular traffic and maintain default parameters for the non-prioritized or regular traffic). The service period (or prioritized time slot 112) can be released (e.g., automatically) when the priority traffic completes.

At operation 404, and in some embodiments, an advertisement 140 can be transmitted. The wireless node 102 can transmit or broadcast an advertisement 140 indicating support for latency sensitive traffic and the first parameters 120 of the slots 112 to one or more wireless devices 150. The wireless node 102 can transmit or broadcast the advertisement 140 to each wireless device 150 in the network 160 and/or connected to the wireless node 102. In embodiments, the wireless node 102 can select one or more wireless devices 150 and transmit the advertisement 140 to the selected wireless devices 150. The wireless device 150 or multiple wireless devices 150 can receive the advertisement message 140 including the first plurality of parameters 120 for a plurality of time slots 112 available for prioritized access in the network 160 (e.g., a wireless local area network (WLAN)) to communicate data. The wireless node 102 can transmit the advertisements 140 periodically, as part or during individual message exchanges with wireless devices 150, or as part of broadcast/multi-cast message exchanges.

The advertisement 140 can be transmitted as a beacon signal, a probe response or an action frame. The advertisement 140 can include the first parameters 120 of the slots 112 indicating prioritized access to the respective slots 112 and/or the advertisement 140 can include second parameters 120 for regular or non-prioritized access to the slots 112. In embodiments, the parameters 120 can indicate/specify/include a duration (e.g., length in terms of time) of a time interval 110, a duration (e.g., length in terms of time) of one or more slots 112, a preferred period, enhanced distribution channel access (EDCA) parameters, inter-frame spacing parameters (e.g., arbitrating inter-frame spacing (A-AIFS)), contention window parameters (e.g., a parameter for a back-off timer), and any parameters associated with the network 160 and/or channels 162 between the node 102 and one or more devices 150. The EDCA parameters can include a first set of EDCA parameters including default or existing parameters and a second set of EDCA parameters including minimum and maximum contention window sizes, AIFS parameters, and/or transmit opportunity (e.g., txop) limits. In some embodiments, the advertisement 140 can include current slot assignments, current status of priority slot assignments and persistence information (e.g., if they are periodic, how many intervals repeat). Slot.

In some embodiments, the wireless node 102 can transmit a message indicating a second plurality of time slots 112 for non-prioritized access to communicate data to the wireless node 102 and/or between wireless devices 150. The wireless devices 150 can receive, from the wireless node 102, a message indicating the second plurality of time slots 112 for non-prioritized access to communicate data. The second plurality of time slots 112 or non-prioritized time slots 112 can be associated with a second plurality of parameters 120 different from the first plurality of parameters 120. In some embodiments, the second plurality of time slots 112 or non-prioritized time slots 112 can be configured having the second plurality of parameters 120 or default parameters 120.

At operation 406, and in some embodiments, a request 142 can be received. The wireless node 102 can receive a request 142 from at least one wireless device 150 to assign at least one time slot 112 of the plurality of time slots 112 to the wireless device 150 for prioritized access. A wireless device 150 can request a particular time slot 112 and transmit the request for the time slot 112 to the wireless node 102, for example, responsive to an application request and learning the parameters 120 of the plurality of time slots 112 through the advertisement 140. For example, a wireless device 150 can send to the wireless node 102, a request 142 to assign a first time slot 112 of the plurality of time slots 112 to the wireless device 150 for prioritized access. In embodiments, the wireless node 102 can receive multiple requests 142 from one or more different wireless devices 150 request to assign one or more time slots 112 to the respective wireless devices 150 for prioritized access. The request 142 can include an identifier for the requesting wireless device 150. The request 142 can identify the requested time slot 112, multiple time slots 112 (e.g., contiguous time slots, service period), a type of traffic 130 (e.g., downlink (DL) traffic, uplink (UL) traffic, peer-to-peer traffic), types of applications (e.g., latency sensitive applications, AR applications, VR applications) associated with the wireless device 150 and/or an predicted amount or level of traffic associated with the applications supported by the wireless device 150. The wireless device 150 can transmit the request 142 to the wireless node 102, for example, through one or more channels 162 to the wireless node 102 over the network 160. In embodiments, the wireless device 150 can establish a connection or communication channel 162 to the wireless node 102 responsive to receiving the advertisement and to transmit the request 142.

At operation 408, and in some embodiments, a type of traffic 130 can be determined. The wireless node 102 can determine a type of traffic 130 associated with the requesting wireless device 150. The type of traffic 130 can include, but is not limited to, traffic associated with latency sensitive applications, prioritized traffic, downlink traffic, and uplink traffic. The wireless node 102 can use the type of traffic 130 to determine whether or not to assign the requested time slot 112 to the wireless device 150. For example, if the wireless device 150 is requesting prioritized access to a time slot 112 for regular traffic or non-prioritized traffic, the wireless node 102 can reject or deny the request 142 for the prioritized access to the time slot 112 if the time slot 112 has been assigned or is occupied and the method (400) can move to (418). In certain embodiments, if the wireless device 150 is requesting prioritized access to a time slot 112 for prioritized traffic, the wireless node 102 can accept the request 142 for the prioritized access to the time slot 112 and the method (400) can move to (410).

At operation 410, and in some embodiments, a time slot 112 can be assigned. The wireless node 102 can assign the first time slot 112 to the wireless device 150. In some embodiments, the wireless node 102 can assign the first time slot 112 to the wireless device 150 responsive to receiving the request 142 for the first time slot 112 and/or a type of traffic 130 associated with the wireless device 150. The wireless device 150 can be assigned prioritized access to the first time slot 112, for example, to provide more predictable channel access to the slots 112 for latency sensitive applications and/or for traffic associated with applications having a higher priority. The wireless devices 150 can know the respective time slot 112 the wireless device 150 is to communicate with the wireless node 102 ahead of time instead of having to attempt to access a time slot 112 that may be already in use (e.g., collision, being accessed by another device 150).

The wireless node 102 can assign the wireless device 150 multiple time slots 112. A wireless device 150 can send, to the wireless node 102, the request 142 to assign a first set of time slots 112 of the plurality of time slots 112 to the wireless device for prioritized access. The first set of time slots 112 can include at least of: a time slot 112 for uplink traffic, a time slot 112 for downlink traffic, a contiguous number of time slots 112, a service period, or a non-contiguous number of time slots 112. In some embodiments, the wireless device 150 can access the first set of time slots 112 according to the first plurality of parameters 120. In some embodiments, the wireless device 150 can request multiple time slots or contiguous time slots 112 based in part on an amount of traffic to communicate between the wireless device 150 and the wireless node 102. In some embodiments, the wireless node 102 can assign a wireless device 150 multiple time slots or contiguous time slots 112 corresponding to a service period. The wireless node 102 can assign the wireless device 150 the requested number of time slots 112 and in some embodiments, the multiple time slots 112 can include contiguous time slots 112.

In some embodiments, the wireless node 102 can assign a time slot 112 to multiple wireless devices 150, for example, for multi-link operations. For example, the wireless node 102 can determine that an amount of traffic associated with a requesting wireless device 150 is less than a duration of the requested time slot 112. The wireless node 102 can assign, allocate or make available a first portion of the time slot 112 to a first wireless device 150 and a second portion to a second, different wireless device 150. The first and second portions of the time slot 120 can be different lengths or durations. In some embodiments, the first and second portions can be the same length or duration. The wireless node 102 can assign a first portion of the time slot 112 to a first wireless device 150 and leave the second portion or remaining time of the time slot 112 open to access for regular or non-prioritized access by one or more wireless devices 150.

At operation 412, and in some embodiments, a response 144 can be transmitted. The wireless node 102 can transmit a response 144 to the wireless device 150 indicating that the first time slot 112 or one more time slots 112 has been assigned to the wireless device 150, and can include the parameters 120 for the assigned time slot 112. The time slot 112 assigned may be the same time slot 112 requested by the wireless device 150 or the time slot 112 assigned may be different from the time slot 112 requested by the wireless device 150 and the response 144 can indicate the time slot 112 assigned to the wireless device 150. For example, the wireless device 150 may request a particular time slot 112 of the advertised plurality of time slots 112 and the wireless node 102 can select a different time slot 112 or adjust slot assignments based in part on a current overall priority of slot assignments to all requesting wireless devices 150, a network service policy or a network performance optimization. In some embodiments, the wireless node 102 can transmit a response 144 to the wireless device 150 or multiple wireless devices 150 indicating the prioritized time slots 112 that have been assigned, the prioritized time slots 112 still unassigned and/or a number of non-prioritized time slots 112 that are available.

At operation 414, and in some embodiments, a time slot 112 can be accessed. The wireless device 150 can access the first time slot 112 according to the one or more parameters 120 of the first plurality of parameters 120. The wireless device 150 can access the assigned time slot 112 as indicated by the wireless node 102 and according to the parameters 120 indicated by the response 144 or agreed upon with the wireless node 102. The wireless device 150 can perform downlink and/or uplink operations (or peer-to-peer transmissions) to the wireless node 102 during the first time slot 112 using the first or prioritized parameters 120. The first parameters 120 can include EDCA parameters, prioritized contention window parameters (e.g., size), and/or prioritized alternate inter-frame spacing parameters. In some embodiments, the first parameters 120 for prioritized access can be more aggressive than the second parameters 120 (e.g., default parameters) for regular access to the time slots 112. The wireless device 150 can transmit, receive or communicate traffic associated with AR/VR type applications or high latency applications using the first parameters 120.

The wireless device 150 can access the first time slot 112 using a first timer 126 configured for prioritized access. The first timer 126 can include or correspond to a back-off timer configured to enable or provide prioritized access to the assigned time slot 112 to the wireless device 150. The first timer 126 can indicate a time period or time frame when access to the assigned time slot 112 is restricted to the wireless device 150 that was assigned the respective time slot 112. In embodiments, the first timer 126 can include a time boundary that is greater than the time period indicating the prioritized access to the assigned time slot 112 for the wireless device 150. For example, the time boundary can include a time period (e.g., X amount of time before prioritized access begins, X amount of time after prioritized access begins or ends) when regular traffic or traffic associated with another wireless device 150 is prevented or not allowed to access the assigned time slot 112. Thus, the assigned time slot 112 can be assigned to the wireless device 150 to avoid, prevent or reduce the chances of a collision with another wireless device 150 attempting to access the assigned time slot 112 at the same time.

In some embodiments, the wireless device 150 can access, for a first type of traffic 130 (e.g., prioritized traffic) according to first plurality of parameters 120, the first time slot 112 according to a contention window 124 and a first timer 126 configured for prioritized access. The wireless device 150 can use the contention window parameters 124 and first timer 126 parameters to check or verify if the first time slot 112 is available at the indicated time and being or initiate transmitting data including the first type of traffic 13 during the first time slot 112. The wireless device 150 can access, for a second type of traffic 130, the first time slot 112 according to a second timer 126 for non-prioritized access. The second timer 126 can be different from the first timer 126. For example, the wireless device 150 can complete or finish transmitting or receiving data of the first traffic type 130 during the time slot 112 (or service period) and prior to the end of the time slot 112 (or service period) and attempt the communicate non-prioritized traffic or data of the second traffic type 130 during the respective time slot 112. The wireless device 150 can use the contention window parameters 124 and first timer 126 parameters as indicated by the second parameters to check or verify that the time slot 112 is still available and not occupied upon completion of transmitting the first type of traffic 130. The wireless device 150 can access the remaining portion of the time slot 112 to communicate the second type of traffic 130 (e.g., non-prioritized traffic 130) responsive to verifying that the time slot 112 is still available.

In some embodiments, the first time slot 112 can be assigned to multiple wireless devices 150 and the wireless devices 150 can use the first parameters 120 to contend or attempt to access the first time slot 112. In certain embodiments, the wireless node 102 can assign different portions or intervals of the same time slot 112 to different wireless devices 150 to enable multiple wireless devices 150 to access the same prioritized time slot 112 for prioritized access. For example, a first wireless device 150 can access a first time interval of the first time slot 112 for a first data communication and a second wireless device 150 can access a second time interval of the first time slot 112 for a second data communication. The second time interval can be different from the first time interval. In embodiments, the first wireless device 150 and the second wireless device 150 can use the first timer 126 and contention window 124 parameters to determine when/how each respective wireless device 150 accesses the first time slot 112.

In embodiments, when the assigned prioritized time slot 112 begins or initiates, the first timer 126 can be activated or resume and be used to determine or control access to the prioritized time slot 112. In some embodiments, a content window 124 can be reset when the first timer 126 is activated. For example, a new or different contention window value (e.g., length, duration) can be set and/or a new or different contention window minimum value can be set. In embodiments, a back-off time value associated with the first timer 126 can be modified or a new back-off time value can be set when the first timer 126 is activated.

The wireless device 150 can transmit data or packets having the first type of traffic 130 (e.g., prioritized traffic) can be transmitted using the first timer 126 during the prioritized time slot 112. The wireless device 150 can complete transmission of the first type of traffic 130 (e.g., prioritized traffic) before the end of the prioritized time slot 112 and request or attempt to transmit the second type of traffic 130 (e.g., regular traffic) during the prioritized time slot 112. For example, the wireless device 150 can finish or complete transmitting all of the data or packets having the first type of traffic 130 to the wireless node 102 prior to the end (e.g., end time) of the prioritized time slot 112 but request to transmit data or packets having the second type of traffic 130 to the wireless node 102 for the remainder of the prioritized time slot 112 or for a time period corresponding to the amount of the second type of traffic to the wireless node 102 during the prioritized time slot 112. In some embodiments, if the wireless device 150 has transmitted all of the data or packets having the first type of traffic 130 or completed transmitting the first type of traffic 130 for the session to the wireless node 102, the wireless device 150 can activate and/or use the second timer 126 to attempt or contend for access to the prioritized time slot 112 for regular traffic (or the second type of traffic the wireless devices 150 requests to transmit to the wireless node 102). For example, responsive to completing transmission of the first type of traffic 130, the wireless device 150 can attempt to access the prioritized time slot 112 using the second timer 126 and the second parameters for transmitting data corresponding to the second type of traffic 130. The method 400 can move/proceed to (418) and the wireless device 150 can use the policies or rules (e.g., second timer 126, second parameters 120) for regular traffic to transmit the second type of traffic 162 to the wireless node 102 during the prioritized time slot 112.

In some embodiments, multiple wireless devices 150 can be assigned prioritized access to the same prioritized time slot 112. A prioritized time slot 112 can be assigned to multiple wireless devices 150 for the wireless devices 150 downlink transmissions, uplink transmissions and/or for peer-to-peer transmissions between the wireless devices 150 and/or the wireless node 102. The wireless devices 150 can be assigned a portion of the prioritized time slot 112 or assigned a specific time to access the prioritized time slot 112, for example, to prevent or reduce collisions between the wireless devices 150. In some embodiments, the wireless devices 150 that have been assigned the same prioritized time slot 112 can contend for access for the prioritized time slot 112 between themselves. For example, the wireless devices 150 can use the first timer 126 (e.g., back-off timer properties) to request access and determine if the prioritized time slot 112 is occupied or un-occupied and available for transmission of the first type of traffic 130 for downlink operations, uplink operations and/or peer-to-peer transmissions.

In some embodiments, the wireless node 102 can use trigger frames to manage downlink transmissions and/or uplink transmissions and/or for peer-to-peer transmissions when multiple wireless devices 150 have been assigned the same prioritized time slot 112 if the respective wireless devices 150 support trigger frames. In certain embodiments, the trigger frames can include frames in the 802.11ax standard to allocate resources and/or solicit transmissions. In some embodiments, the wireless node 102 can generate the trigger frame to include information to the wireless devices 150 indicating time synchronization and/or frequency synchronization so that simultaneous downlink and/or uplink transmissions do not interfere with each other. The wireless node 102 can use trigger frames to include transmission scheduling information and to indicate to the wireless devices 150 when to perform downlink or uplink transmissions from the respective wireless device 150 at an indicated time to reduce or prevent collisions between the wireless devices 150 during the prioritized time slot 112. In some embodiments, the wireless node 102 can use triggered peer-to-peer (P2P) transmission procedure to manage peer-to-peer transmissions when multiple wireless devices 150 have been assigned the same prioritized time slot 112 if the respective wireless devices 150. The wireless node 102 can use the trigger frames and/or triggered P2P transmission procedures to facilitate communications between the wireless devices 150 and the wireless node 102 and/or between the wireless devices 150.

At operation 416, and in some embodiments, a determination can be made to allow access to a time slot 112. For example, a wireless device 150 can attempt to access a time slot 112 for non-prioritized access or regular access. The wireless node 102 can determine if the requested time slot 112 is assigned or designated for prioritized access or is available for non-prioritized access. If the time slot 112 is available for non-prioritized access, the method 400 can move to (418) to allow access to the time slot 112. If the time slot 112 is assigned or designated for prioritized access, the method 400 can move to (420) to deny access to the time slot 112 or determine if the time slot 112 is being currently accessed for prioritized access.

At operation 418, and in some embodiments, a wireless device 150 can access a time slot 112 for non-prioritized access. The wireless node 102 can determine the time slot 112 is a non-prioritized time slot 112 and the wireless device 150 can access the time slot 112 (e.g., regular time slot) according to the second plurality of parameters 120. In some embodiments, the wireless device 150 can access, after the first time slot 112, a second time slot 112 of the plurality of time slots 112 according to a second plurality of parameters 120 different from the first plurality of parameters 120, for example, to communicate non-prioritized traffic 130 after completing communicating prioritized traffic 130 during the first time slot 112. The wireless device 150 can transmit, receive and/or perform downlink operations and/or uplink operations to the wireless node 102 during the time slot 112 using the second parameters 120. The wireless device 150 can perform peer-to-peer transmissions to one or more other wireless devices 150 through the network 160 during the time slot 112 using the second parameters 120. The second parameters 120 can include default parameters or parameters 120 that are different (e.g., less aggressive) than the first parameters 120 used for prioritized access. In some embodiments, the second parameters 120 can include default EDCA parameters, default contention window parameters, and/or default inter-frame spacing parameters. In embodiments, for non-prioritized time slots 112, the wireless devices 150 can access the non-prioritized time slots 112 using default EDCA parameters 120 and/or according to default content window parameters.

The wireless device 150 can access the non-prioritized time slot 112 using a second timer 126 configured for non-prioritized access. The second timer 126 can include or correspond to a back-off timer configured to enable or handle collisions between multiple wireless devices 150 seeking access to a time slot 112. The second timer 126 can indicate a period of time for a wireless device 150 to wait after determining a channel or time slot 112 is occupied or not clear to check again or attempt to access the respective time slot 112 after the collision. In some embodiments, if the channel or time slot 112 is clear after the time period of the second timer 126 expires, the wireless device 150 can access the time slot 112 for non-prioritized access.

At operation 420, and in some embodiments, a determination can be made if the prioritized time slot 112 is actively being used or is available. In embodiments, the wireless node 102 or the wireless device 150 can determine (e.g., via energy detection or sniffing) if the prioritized time slot 112 is actively being used or is available. In embodiments, a wireless device 150 can attempt to access a prioritized time slot 112 for non-prioritized access and the wireless node 102 can determine if the prioritized time slot 112 is assigned or currently being accessed by another wireless device 150. If the time slot 112 is not being used, the method 400 can move/proceed to (422) and the wireless device 150 can access the prioritized time slot 112 for non-prioritized access. If the time slot 112 is occupied or being used, the method 400 can move/proceed to (424) and the wireless device 150 can wait a determined amount of time to determine if the respective slot 112 becomes available or wait for another time slot 112.

At operation 422, and in some embodiments, a wireless device 150 can access a prioritized time slot 112 for non-prioritized access. The wireless device 150 can access the prioritized time slot 112 according to the second plurality of parameters 120 and based in part on the first timer 126 to transmit, receive or communicate the second type of traffic 130 (e.g., regular traffic 130, non-prioritized traffic 130). For example, the wireless device 150 can access a prioritized time slot 112 if the prioritized time slot is available, un-occupied or not being used currently. The wireless device 150 can transmit, receive and/or perform downlink and/or uplink operations to the wireless node 102 during the prioritized time slot 112 using the second parameters 120 as the type of traffic 130 includes the second type or regular traffic. In some embodiments, the parameters 120 used to communicate data between the wireless node 102 and the wireless devices 150 can be based in part on the type of traffic 130. If the prioritized time slot 112 is available, and for efficiency reasons, the wireless node 102 can permit or allow one or more wireless devices 150 to transmit, receive or communicate the second type of traffic 130 during the un-occupied time slot 112 using the second parameters 120.

At operation 424, and in some embodiments, a wireless device 150 can await for the prioritized time slot 112 or a next available time slot 112 to become available. The wireless device 150 can attempt to access a prioritized time slot 112 and the attempt can be denied or prevented, for example, by the wireless node 102. The wireless device 150 can determine that the prioritized time slot 112 is occupied or being used, for example, by another wireless device 150 assigned to the prioritized time slot 112. In embodiments, the wireless node 102 can provide an indication that the attempt to access the prioritized time slot 112 is denied to the wireless device 150. In some embodiments, the wireless device 150 can be prevented access to the prioritized time slot 112 based in part on the first timer 126 (e.g., first timer parameters) configured for the prioritized access. For example, during the prioritized time slot 112 or a time period associated with the prioritized time slot 112, the second timer 126 can be disabled or suspended and attempts to access a prioritized time slot 112 for non-prioritized access can be prevented based in part on a time boundary of the first timer 126. The time boundary/margin of the first timer 126 can include a time window/delineation before and after an initial time or starting time for the prioritized time slot 112 that non-prioritized traffic 130 (e.g., second type of traffic 130) is prevented or not allowed to access or start transmission during prioritized time slot 112. The time boundary of the first timer 126 can provide a buffer for a wireless device 150 assigned to the prioritized time slot 112 to access the prioritized time slot 112 without the potential for collision from another wireless device 150 attempting to access the prioritized time slot 112.

The wireless device 150 attempting to transmit non-prioritized traffic (e.g., second type of traffic) can wait a determined time period as indicated or instructed by the first timer 126 that indicates when the prioritized time slot 112 is available for non-prioritized access. In some embodiments, the determined time period for non-prioritized access to the prioritized time slot 112 can include or correspond to a second portion of the prioritized time slot 112. After, the determined time period, the wireless device 150 can attempt to access the prioritized time slot 112 for non-prioritized access. In certain embodiments, if the prioritized time slot 112 is available or un-occupied after the determined time period, the wireless device 150 can be given access or given priority to the prioritized time slot 112 for the remaining duration of the prioritized time slot 112 or until a wireless device 150 attempting to transmit priority traffic 130 (e.g., first type of traffic 130) attempts to access the prioritized time slot 112. The wireless device 150 can access the prioritized time slot 112 for non-prioritized access using the second parameters 120 while the prioritized time slot 112 is available to the respective wireless device 150.

In some embodiments, the wireless device 150 attempting to transmit non-prioritized traffic (e.g., second type of traffic) can wait for a next non-prioritized time slot 112 to be available. The wireless device 150 can determine or identify the prioritized time slots 112 and non-prioritized time slots 112 based in part on the advertisement 140 from the wireless node 102. If the wireless device 150 attempting to transmit non-prioritized traffic is denied or prevented access, the wireless device 150 can determine the next non-prioritized time slot 112 using the information from the advertisement 140 and can attempt to access the next non-prioritized time slot 112 according to the second parameters 120.

Figure 5:
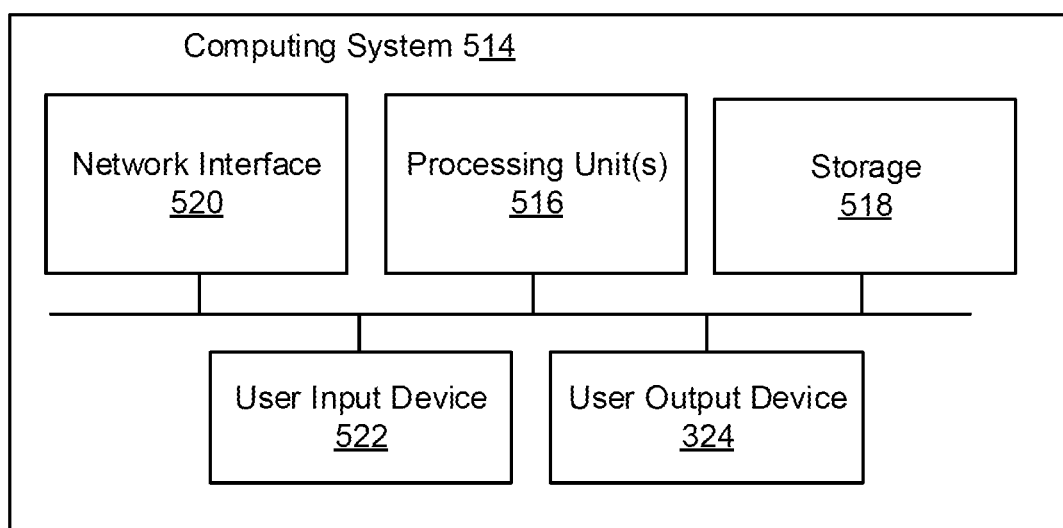
FIG. 5 is a block diagram of a computing environment according to an example implementation of the present disclosure.

Various operations described herein can be implemented on computer systems. FIG. 5 shows a block diagram of a representative computing system 514 usable to implement the present disclosure. In some embodiments, the wireless node 102, wireless device 150 or both of FIG. 1 are implemented by the computing system 514. Computing system 514 can be implemented, for example, as a consumer device such as a smartphone, other mobile phone, tablet computer, wearable computing device (e.g., smart watch, eyeglasses, head wearable display), desktop computer, laptop computer, or implemented with distributed computing devices. The computing system 514 can be implemented to provide VR, AR, MR experience. In some embodiments, the computing system 514 can include conventional computer components such as processors 516, storage device 518, network interface 520, user input device 522, and user output device 524.

Network interface 520 can provide a connection to a wide area network (e.g., the Internet) to which WAN interface of a remote server system is also connected. Network interface 520 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

User input device 522 can include any device (or devices) via which a user can provide signals to computing system 514; computing system 514 can interpret the signals as indicative of particular user requests or information. User input device 522 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 524 can include any device via which computing system 514 can provide information to a user. For example, user output device 524 can include a display to display images generated by or delivered to computing system 514. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 524 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 516 can provide various functionality for computing system 514, including any of the functionality described herein as being performed by a server or client, or other functionality associated with message management services.

It will be appreciated that computing system 514 is illustrative and that variations and modifications are possible. Computer systems used in connection with the present disclosure can have other capabilities not specifically described here. Further, while computing system 514 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method comprising:
receiving, by a wireless device from a wireless node, an advertisement message comprising an indication of support for latency sensitive traffic and a first plurality of parameters for a plurality of time slots available for prioritized access in a wireless local area network (WLAN) to communicate data;
sending, by the wireless device to the wireless node, a request to assign at least one time slot of the plurality of time slots to the wireless device for prioritized access, the request including an indication of a type of traffic associated with the wireless device and including an indication of a type of one or more applications associated with the wireless device, wherein the at least one time slot of the plurality of time slots comprises a first set of time slots, the first set of time slots comprising (1) a time slot for uplink traffic, (2) a time slot for downlink traffic, (3) a contiguous number of time slots, and (4) a non-contiguous number of time slots;
receiving, by the wireless device from the wireless node, a response granting access to a first time slot of the plurality of time slots, the response indicating one or more parameters of the first plurality of parameters for the first time slot; and
accessing, by the wireless device, the first time slot for the type of traffic indicated in the request, according to the one or more parameters of the first plurality of parameters indicated in the response.

2. The method of claim 1, comprising receiving, by the wireless device from the wireless node, a message indicating a second plurality of time slots for non-prioritized access to communicate data, the second plurality of time slots associated with a second plurality of parameters different from the first plurality of parameters.

3. The method of claim 1, wherein the first plurality of parameters includes enhanced distribution channel access (EDCA) parameters for prioritized access.

4. The method of claim 1, wherein the first plurality of parameters includes at least one of: a parameter of a time interval duration that includes one or more of the time slots, a parameter for slot duration, a parameter for contention window or a parameter for interframe spacing.

5. The method of claim 1, comprising:
accessing, by the wireless device for a first type of traffic according to the first plurality of parameters, the first time slot according to a contention window and a first timer configured for prioritized access; and
accessing, by the wireless device for a second type of traffic, the first time slot according to a second timer for non-prioritized access, the second timer different from the first timer.

6. The method of claim 1, comprising:
accessing, by the wireless device, a second time slot of the plurality of time slots according to a second plurality of parameters different from the first plurality of parameters.

7. The method of claim 1, comprising:
accessing, by the wireless device, the first set of time slots according to the first plurality of parameters.

8. The method of claim 1, comprising;
accessing, by the wireless device, a first time interval of the first time slot for a first data communication; and
accessing, by a second wireless device, a second time interval of the first time slot for a second data communication, the second time interval different from the first time interval.

9. The method of claim 1, comprising receiving, by the wireless device from the wireless node responsive to the request, the response assigning the first time slot of the plurality of time slots to the wireless device, wherein the first time slot is a different time slot from the at least one time slot requested by the wireless device.

10. The method of claim 1, wherein the advertisement message includes at least one of: a beacon signal, a probe response or an action frame.

11. A wireless device comprising:
one or more processors configured to:
receive, from a wireless node, an advertisement message comprising an indication of support for latency sensitive traffic and a first plurality of parameters for a plurality of time slots available for prioritized access in a wireless local area network (WLAN) to communicate data;
send, to the wireless node, a request to assign at least one time slot of the plurality of time slots to the wireless device for prioritized access, the request including an indication of a type of traffic associated with the wireless device and including an indication of a type of one or more applications associated with the wireless device, wherein the at least one time slot of the plurality of time slots comprises a first set of time slots, the first set of time slots comprising (1) a time slot for uplink traffic, (2) a time slot for downlink traffic, (3) a contiguous number of time slots, and (4) a non-contiguous number of time slots;
receive, from the wireless node, a response granting access to a first time slot of the plurality of time slots, the response indicating one or more parameters of the first plurality of parameters for the first time slot; and
access the first time slot for the type of traffic indicated in the request, according to the one or more parameters of the first plurality of parameters indicated in the response.

12. The wireless device of claim 11, wherein the one or more processors are configured to:
receive, from the wireless node, a message indicating a second plurality of time slots for non-prioritized access to communicate data, the second plurality of time slots associated with a second plurality of parameters different from the first plurality of parameters.

13. The wireless device of claim 11, wherein the first plurality of parameters includes enhanced distribution channel access (EDCA) parameters for prioritized access.

14. The wireless device of claim 11, wherein the first plurality of parameters include at least one of: a parameter of a time interval duration that includes one or more of the slots, a parameter for slot duration, a parameter for contention window or a parameter for interframe spacing.

15. The wireless device of claim 11, wherein the one or more processors are configured to:
access, for a first type of traffic according to the first plurality of parameters, the first time slot according to a contention window and a first timer configured for prioritized access; and
access, for a second type of traffic, the first time slot according to a second timer for non-prioritized access, the second timer different from the first timer.

16. The wireless device of claim 11, wherein the one or more processors are configured to:
access a second time slot of the plurality of time slots according to a second plurality of parameters different from the first plurality of parameters.

17. The wireless device of claim 11, wherein the one or more processors are configured to:
access the first set of time slots according to the first plurality of parameters.

18. The wireless device of claim 11, wherein the one or more processors are configured to:
receive, from the wireless node responsive to the request, the response assigning the first slot of the plurality of slots to the wireless device, wherein the first time slot is a different time slot from the at least one time slot requested by the wireless device.

19. A method comprising:
configuring, by a wireless node, a time interval into a plurality of time slots having a first plurality of parameters for prioritized access in a wireless local area network (WLAN) to communicate data;
transmitting, by the wireless node to a plurality of wireless devices, an advertisement message indicating the plurality of time slots available for prioritized access to communicate data; and
receiving, by the wireless node from a first wireless device of the plurality of wireless devices, a request to assign a first set of time slots of the plurality of time slots to the first wireless device for prioritized access, the request including an indication of a type of traffic associated with the first wireless device and including an indication of a type of one or more applications associated with the wireless device, wherein the first set of time slots comprises (1) a time slot for uplink traffic, (2) a time slot for downlink traffic, (3) a contiguous number of time slots, and (4) a non-contiguous number of time slots,
wherein the first wireless device accesses the first set of time slots for the type of traffic indicated in the request, according to the first plurality of parameters.

20. A wireless node comprising:
one or more processors configured to implement the method of claim 19.

* * * * *